(12) United States Patent
Shrestha et al.

(10) Patent No.: US 12,335,044 B2
(45) Date of Patent: Jun. 17, 2025

(54) HYBRID AUTOMATIC REPEAT REQUEST FEEDBACK IN NETWORK

(71) Applicant: QUALCOMM Incorporated, San Diego, CA (US)

(72) Inventors: Bharat Shrestha, San Diego, CA (US); Xiao Feng Wang, San Diego, CA (US); Alberto Rico Alvarino, San Diego, CA (US); Umesh Phuyal, San Diego, CA (US); Peter Gaal, San Diego, CA (US); Liangping Ma, San Diego, CA (US); Ayan Sengupta, San Diego, CA (US); Prasad Reddy Kadiri, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 17/389,059

(22) Filed: Jul. 29, 2021

(65) Prior Publication Data

US 2022/0038214 A1  Feb. 3, 2022

Related U.S. Application Data

(60) Provisional application No. 63/059,132, filed on Jul. 30, 2020.

(51) Int. Cl.
*H04L 1/1812* (2023.01)
*H04L 1/08* (2006.01)

(52) U.S. Cl.
CPC .............. *H04L 1/1812* (2013.01); *H04L 1/08* (2013.01)

(58) Field of Classification Search
CPC ....... H04L 1/1812; H04L 1/08; H04L 1/1864; H04L 1/188; H04L 1/189; H04L 1/1896; H04L 1/1822
See application file for complete search history.

(56) References Cited

U.S. PATENT DOCUMENTS

2020/0044792 A1\* 2/2020 Vaidya ............... H04L 47/34
2021/0160879 A1\* 5/2021 Lin ................ H04W 72/0453
(Continued)

FOREIGN PATENT DOCUMENTS

WO    2020092831 A1    5/2020

OTHER PUBLICATIONS

International Search Report and Written Opinion—PCT/US2021/044001—ISA/EPO—dated Nov. 12, 2021.
(Continued)

*Primary Examiner* — Abdullahi Ahmed
(74) *Attorney, Agent, or Firm* — Muncy, Geissler, Olds & Lowe, P.C./QUALCOMM Incorporated

(57) ABSTRACT

In a communication between a user equipment (UE) and a network node, the UE may receive a grant of uplink (UL) shared channel (SCH) resources from the network node. Each of the UL SCH resources may be associated with one of a plurality of hybrid automatic repeat request (HARQ) processes. Each HARQ process may be at least one of a plurality of HARQ process types, and each HARQ process type may be based on HARQ feedback status and HARQ retransmission status. The UE may transmit a control message on one or more UL SCH resources in response to the one or more UL SCH resources being determined to be usable based on the HARQ process type of the HARQ processes associated with the one or more of the UL SCH resources.

63 Claims, 12 Drawing Sheets

(56) References Cited

U.S. PATENT DOCUMENTS

| | | | |
|---|---|---|---|
| 2021/0219241 A1* | 7/2021 | Wang | H04L 1/1887 |
| 2022/0038214 A1* | 2/2022 | Shrestha | H04L 1/1864 |
| 2022/0038243 A1 | 2/2022 | Shrestha et al. | |
| 2022/0216912 A1* | 7/2022 | Hu | H04B 7/1855 |
| 2022/0286242 A1* | 9/2022 | Khan | H04W 72/23 |
| 2023/0120684 A1* | 4/2023 | Gha | H04L 1/1822 |
| | | | 370/329 |
| 2023/0319822 A1* | 10/2023 | Park | H04W 72/1273 |
| | | | 370/329 |

OTHER PUBLICATIONS

Nokia., et al.,"Discussion on LCP Procedure for NTN," 3GPP Draft,3GPP TSG-RAN WG2 Mtg #107bis, R2-1913388, Discussion on LCP Procedure for NTN,3RD Gen Partnership Project (3GPP),Mobile Competence Centre,650, Route Des Lucioles, F-06921, Sophia-Antipolis Cedex,FR, vol. RAN WG2. No. Chongqing, CN,Oct. 14, 2019-Oct. 18, 2019,Oct. 4, 2019 (Oct. 4, 2019),XP051804967,5 pgs, Retrieved from Internet:RL:https://ftp.3gpp.org/tsg_ran/WG2_RL2/TSGR2 _107bis/Docs/R2-1913388.zipR2-1913388 Discussion LCP procedure NTN.docx[retrieved Oct. 4, 2019]Sec 1-2,Fig 1,whole doc.

Oppo: "Discussion on CG and SPS in NTN", 3GPP Draft, 3GPP TSG-RAN WG2 Meeting #108, R2-1915166, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051817062, 3 Pages, Retrieved from the Internet: URL: https://ftp.3gpp.org/tsg_ran/WG2_RL2/TSGR2_108/Docs/R2-1915166.zip. R2-1915166.doc [retrieved on Nov. 8, 2019] Section 1, Section 2, section 2.1.

* cited by examiner

HYBRID AUTOMATIC REPEAT REQUEST FEEDBACK IN NETWORK

CROSS-REFERENCE TO RELATED APPLICATION

The present Application for Patent claims the benefit of U.S. Provisional Patent Application No. 63/059,132 entitled "HYBRID AUTOMATIC REPEAT REQUEST FEEDBACK IN NON-TERRESTRIAL NETWORK," filed Jul. 30, 2020, assigned to the assignee hereof, and expressly incorporated herein by reference in its entirety.

INTRODUCTION

Various aspects described herein generally relate to wireless communications, and more particularly to hybrid automatic repeat request (HARQ) in a network.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. It is desirable to support several hundreds of thousands of simultaneous connections in order to support large sensor deployments. Consequently, one aim is to significantly enhance the spectral efficiency of 5G mobile communications. Another aim is to enhance signaling efficiencies and substantially reduce latency.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An aspect directed to a method performed by a user equipment (UE) is disclosed. The method may comprise receiving a grant of uplink (UL) shared channel (SCH) resources from a network node. Each of the UL SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The method may also comprise transmitting a control message on one or more of the UL SCH resources in response to the one or more UL SCH resources being determined to be usable based on the HARQ process type of the HARQ processes associated with the one or more of the UL SCH resources. The control message may be a radio resource control (RRC) message or a medium access control (MAC) control element (CE).

An aspect directed to a user equipment (UE) is disclosed. The UE may comprise means for receiving a grant of uplink (UL) shared channel (SCH) resources from a network node. Each of the UL SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The UE may also comprise means for transmitting a control message on one or more of the UL SCH resources in response to the one or more UL SCH resources being determined to be usable based on the HARQ process type of the HARQ processes associated with the one or more of the UL SCH resources. The control message may be a radio resource control (RRC) message or a medium access control (MAC) control element (CE).

An aspect directed to a user equipment (UE) is disclosed. The UE may comprise a memory and at least one processor coupled to the memory. The memory and the at least one processor may be configured to receive a grant of uplink (UL) shared channel (SCH) resources from a network node. Each of the UL SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The memory and the at least one processor may also be configured to transmit a control message on one or more of the UL SCH resources in response to the one or more UL SCH resources being determined to be usable based on the HARQ process type of the HARQ processes associated with the one or more of the UL SCH resources. The control message may be a radio resource control (RRC) message or a medium access control (MAC) control element (CE).

An aspect directed non-transitory computer-readable medium storing computer-executable instructions for a user equipment (UE) is disclosed. The computer-executable instruction may comprise one or more instruction that cause the UE to receive a grant of uplink (UL) shared channel (SCH) resources from a network node. Each of the UL SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The computer-executable instruction may also comprise one or more instruction that cause the UE to transmit a control message on one or more of the UL SCH resources in response to the one or more UL SCH resources being determined to be usable based on the HARQ process type of the HARQ processes associated with the one or more of the UL SCH resources. The control message may be a radio resource control (RRC) message or a medium access control (MAC) control element (CE).

An aspect directed to a method performed by a network node is disclosed. The method may comprise transmitting a control message on one or more downlink (DL) shared channel (SCH) resources when the one or more DL SCH resources are determined to be usable for the control message based on a HARQ process type of the HARQ processes associated with the one or more of the DL SCH resources. Each HARQ process may be at least one of a plurality of HARQ process types. Each HARQ process type may be being based on HARQ feedback status and HARQ retransmission status. The control message may be a radio resource control (RRC) message or a medium access control (MAC) control element (CE). The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled.

An aspect directed to a network node is disclosed. The network node may comprise means for transmitting a control message on one or more downlink (DL) shared channel (SCH) resources when the one or more DL SCH resources are determined to be usable for the control message based on a HARQ process type of the HARQ processes associated with the one or more of the DL SCH resources. Each HARQ process may be at least one of a plurality of HARQ process types. Each HARQ process type may be being based on HARQ feedback status and HARQ retransmission status. The control message may be a radio resource control (RRC) message or a medium access control (MAC) control element (CE). The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled.

An aspect also directed to a network node is disclosed. The network node may comprise a memory and at least one processor coupled to the memory. The memory and the at least one processor may be configured to transmit a control message on one or more downlink (DL) shared channel (SCH) resources when the one or more DL SCH resources are determined to be usable for the control message based on a HARQ process type of the HARQ processes associated with the one or more of the DL SCH resources. Each HARQ process may be at least one of a plurality of HARQ process types. Each HARQ process type may be being based on HARQ feedback status and HARQ retransmission status. The control message may be a radio resource control (RRC) message or a medium access control (MAC) control element (CE). The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled.

An aspect directed non-transitory computer-readable medium storing computer-executable instructions for a network node is disclosed. The computer-executable instruction may comprise one or more instruction that cause the network node to transmit a control message on one or more downlink (DL) shared channel (SCH) resources when the one or more DL SCH resources are determined to be usable for the control message based on a HARQ process type of the HARQ processes associated with the one or more of the DL SCH resources. Each HARQ process may be at least one of a plurality of HARQ process types. Each HARQ process type may be being based on HARQ feedback status and HARQ retransmission status. The control message may be a radio resource control (RRC) message or a medium access control (MAC) control element (CE). The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled.

An aspect directed to a method performed by a user equipment (UE) is disclosed. The method may comprise receiving a grant of shared channel (SCH) resources from a network node. The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The method may also comprise transmitting an UL message on one or more of the UL SCH resources in response to the one or more UL SCH resources being determined to be usable based on the HARQ process type of the HARQ processes associated with the one or more of the UL SCH resources. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect directed to a user equipment (UE) is disclosed. The UE may comprise means for receiving a grant of shared channel (SCH) resources from a network node. The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The UE may also comprise means for transmitting an UL message on one or more of the UL SCH resources in response to the one or more UL SCH resources being determined to be usable based on the HARQ process type of the HARQ processes associated with the one or more of the UL SCH resources. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect directed to a user equipment (UE) is disclosed. The UE may comprise a memory and at least one processor coupled to the memory. The memory and the at least one processor may be configured to receive a grant of shared channel (SCH) resources from a network node. The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The memory and the at least one processor may also be configured to transmit an UL message on one or more of the UL SCH resources in response to the one or more UL SCH resources being determined to be usable based on the HARQ process type of the HARQ processes associated with the one or more of the UL SCH resources. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect directed non-transitory computer-readable medium storing computer-executable instructions for a user equipment (UE) is disclosed. The computer-executable instruction may comprise one or more instruction that cause the UE to receive a grant of shared channel (SCH) resources from a network node. The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The computer-executable instruction may also comprise one or more instruction that cause the UE to transmit an UL message on one or more of the UL SCH resources in response to the one or more UL SCH resources being determined to be usable based on the HARQ process type of the HARQ processes associated with the one or more of the UL SCH resources. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect directed to a method performed by a network node is disclosed. The method may comprise sending a grant of shared channel (SCH) resources to a user equipment (UE). The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The method may also comprise receiving an UL message on one or more of the UL SCH resources. The method may further comprise sending a HARQ positive acknowledgment (ACK) to the UE when the UL message is correctly received and when a HARQ process associated with the one or more UL SCH resources has HARQ feedback enabled. The method may yet comprise sending a HARQ negative acknowledgment (NACK) to the UE when the UL message is incorrectly received and when the HARQ process associated with the one or more UL SCH resources has HARQ feedback enabled. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect directed to a network node is disclosed. The network node may comprise means for sending a grant of shared channel (SCH) resources to a user equipment (UE). The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The network node may also comprise means for receiving an UL message on one or more of the UL SCH resources. The network node may further comprise means for sending a HARQ positive acknowledgment (ACK) to the UE when the UL message is correctly received and when a HARQ process associated with the one or more UL SCH resources has HARQ feedback enabled. The network node may yet comprise means for sending a HARQ negative acknowledgment (NACK) to the UE when the UL message is incorrectly received and when the HARQ process associated with the one or more UL SCH resources has HARQ feedback enabled. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect also directed to a network node is disclosed. The network node may comprise a memory and at least one processor coupled to the memory. The memory and the at least one processor may be configured to send a grant of shared channel (SCH) resources to a user equipment (UE). The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The memory and the at least one processor may also be configured to receive an UL message on one or more of the UL SCH resources. The memory and the at least one processor may further be configured to send a HARQ positive acknowledgment (ACK) to the UE when the UL message is correctly received and when a HARQ process associated with the one or more UL SCH resources has HARQ feedback enabled. The memory and the at least one processor may yet be configured to send a HARQ negative acknowledgment (NACK) to the UE when the UL message is incorrectly received and when the HARQ process associated with the one or more UL SCH resources has HARQ feedback enabled. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect directed non-transitory computer-readable medium storing computer-executable instructions for a network node is disclosed. The computer-executable instruction may comprise one or more instruction that cause the network node to send a grant of shared channel (SCH) resources to a user equipment (UE). The SCH resources may comprise uplink (UL) SCH resources or downlink (DL) SCH resources or both. Each of the SCH resources may be associated with one of a plurality of hybrid automatic repeat request (HARQ) processes. Each HARQ process may be at least one of a plurality of HARQ process types. Each HARQ process type may be based on HARQ feedback status and HARQ retransmission status. The computer-executable instruction may also comprise one or more instruction that cause the network node to receive an UL message on one or more of the UL SCH resources. The computer-executable instruction may further comprise one or more instruction that cause the network node to send a HARQ positive acknowledgment (ACK) to the UE when the UL message is correctly received and when a HARQ process associated with the one or more UL SCH resources has HARQ feedback enabled. The computer-executable instruction may yet comprise one or more instruction that cause the network node to send a HARQ negative acknowledgment (NACK) to the UE when the UL message is incorrectly received and when the HARQ process associated with the one or more UL SCH resources has HARQ feedback enabled. The plurality of HARQ process types may include first, second, third, and fourth HARQ process types. The first HARQ process type may have the HARQ feedback enabled and the HARQ retransmission enabled. The second HARQ process type may have the HARQ feedback enabled and the HARQ retransmission disabled. The third HARQ process type may have the HARQ feedback disabled and the HARQ retransmission enabled. The fourth HARQ process type may have the HARQ feedback disabled and the HARQ retransmission disabled. A HARQ process type of at least one HARQ process may be the second HARQ process type.

An aspect directed to a method performed by a user equipment is disclosed. The method may comprise receiving a grant of one or more uplink (UL) shared channel (SCH) resources from a network node. Each of the one or more UL SCH resources may be associated with one of a plurality of hybrid automatic repeat request (HARQ) processes. Each HARQ process may be one of a plurality of HARQ process types. The method may also comprise determining whether one or more of the granted UL SCH resources are usable to send a message based on the HARQ process type of the HARQ process associated with each granted UL SCH resource. The message may be a signaling message. The method may further comprise transmitting the message on the one or more of the granted UL SCH resources when the one or more of the granted UL SCH resources are determined to be usable.

An aspect directed to a user equipment is disclosed. The user equipment may comprise means for receiving a grant of one or more uplink (UL) shared channel (SCH) resources from a network node. Each of the one or more UL SCH resources may be associated with one of a plurality of hybrid automatic repeat request (HARQ) processes. Each HARQ process may be one of a plurality of HARQ process types. The user equipment may also comprise means for determining whether one or more of the granted UL SCH resources are usable to send a message based on the HARQ process type of the HARQ process associated with each granted UL SCH resource. The message may be a signaling message. The user equipment may further comprise means for transmitting the message on the one or more of the granted UL SCH resources when the one or more of the granted UL SCH resources are determined to be usable.

An aspect also directed to a user equipment is disclosed. The user equipment may comprise a memory and at least one processor coupled to the memory. The memory and the at least one processor may be configured to receive a grant of one or more uplink (UL) shared channel (SCH) resources from a network node. Each of the one or more UL SCH resources may be associated with one of a plurality of hybrid automatic repeat request (HARQ) processes. Each HARQ process may be one of a plurality of HARQ process types. The memory and the at least one processor may also be configured to determine whether one or more of the granted UL SCH resources are usable to send a message based on the HARQ process type of the HARQ process associated with each granted UL SCH resource. The message may be a signaling message. The memory and the at least one processor may further be configured to transmit the message on the one or more of the granted UL SCH resources when the one or more of the granted UL SCH resources are determined to be usable.

An aspect directed non-transitory computer-readable medium storing computer-executable instructions for a user equipment (UE) is disclosed. The computer-executable instruction may comprise one or more instruction that cause the UE to receive a grant of one or more uplink (UL) shared channel (SCH) resources from a network node. Each of the one or more UL SCH resources may be associated with one of a plurality of hybrid automatic repeat request (HARQ) processes. Each HARQ process may be one of a plurality of HARQ process types. The computer-executable instruction may also comprise one or more instruction that cause the UE to determine whether one or more of the granted UL SCH resources are usable to send a message based on the HARQ process type of the HARQ process associated with each granted UL SCH resource. The message may be a signaling message. The computer-executable instruction may further comprise one or more instruction that cause the UE to transmit the message on the one or more of the granted UL SCH resources when the one or more of the granted UL SCH resources are determined to be usable.

An aspect directed to a method performed by a network node is disclosed. The method may comprise sending a grant of one or more uplink (UL) shared channel (SCH) resources to a user equipment (UE). Each of the one or more UL SCH resources may be associated with one of a plurality of hybrid automatic repeat request (HARQ) processes. Each HARQ process may be one of a plurality of HARQ process types. The method may also comprise determining whether a message from the UE carried on one or more UL SCH resources is received correctly. The message may be a signaling message. The method may further comprise sending a HARQ positive acknowledgment (ACK) to the UE when the message is correctly received and when a HARQ process associated with the one or more UL SCH resources has HARQ feedback enabled. The method may yet comprise sending a HARQ negative acknowledgment (NACK) to the UE when the message is incorrectly received and when the HARQ process associated with the one or more UL SCH resources has HARQ feedback enabled.

An aspect directed to a network node is disclosed. The network node may comprise means for sending a grant of one or more uplink (UL) shared channel (SCH) resources to a user equipment (UE). Each of the one or more UL SCH resources may be associated with one of a plurality of hybrid automatic repeat request (HARQ) processes. Each HARQ process may be one of a plurality of HARQ process types. The network node may also comprise means for determining whether a message from the UE carried on one or more UL SCH resources is received correctly. The message may be a signaling message. The network node may further comprise means for sending a HARQ positive acknowledgment (ACK) to the UE when the message is correctly received and when a HARQ process associated with the one or more UL SCH resources has HARQ feedback enabled. The network node may yet comprise means for sending a HARQ negative acknowledgment (NACK) to the UE when the message is incorrectly received and when the HARQ process associated with the one or more UL SCH resources has HARQ feedback enabled.

An aspect also directed to a network node is disclosed. The network node may comprise a memory and at least one processor coupled to the memory. The memory and the at least one processor may be configured to send a grant of one or more uplink (UL) shared channel (SCH) resources to a user equipment (UE). Each of the one or more UL SCH resources may be associated with one of a plurality of hybrid automatic repeat request (HARQ) processes. Each HARQ process may be one of a plurality of HARQ process types. The memory and the at least one processor may also be configured to determine whether a message from the UE carried on one or more UL SCH resources is received correctly. The message may be a signaling message. The memory and the at least one processor may further be configured to send a HARQ positive acknowledgment (ACK) to the UE when the message is correctly received and when a HARQ process associated with the one or more UL SCH resources has HARQ feedback enabled. The memory and the at least one processor may yet be configured to send a HARQ negative acknowledgment (NACK) to the UE when the message is incorrectly received and when the HARQ process associated with the one or more UL SCH resources has HARQ feedback enabled.

An aspect directed to non-transitory computer-readable medium storing computer-executable instructions for a network node is disclosed. The computer-executable instruction may comprise one or more instruction that cause the network node to send a grant of one or more uplink (UL) shared channel (SCH) resources to a user equipment (UE). Each of the one or more UL SCH resources may be associated with one of a plurality of hybrid automatic repeat request (HARQ) processes. Each HARQ process may be one of a plurality of HARQ process types. The computer-executable instruction may also comprise one or more instruction that cause the network node to determine whether a message from the UE carried on one or more UL SCH resources is received correctly. The message may be a signaling message. The computer-executable instruction may further comprise one or more instruction that cause the network node to send a HARQ positive acknowledgment (ACK) to the UE when the message is correctly received and when a HARQ process associated with the one or more UL SCH resources has HARQ feedback enabled. The computer-executable instruction may yet comprise one or more instruction that cause the network node to send a HARQ negative acknowledgment (NACK) to the UE when the message is incorrectly received and when the HARQ process associated with the one or more UL SCH resources has HARQ feedback enabled.

An aspect directed to a method performed by a network node is disclosed. The method may comprise sending a grant of one or more downlink (DL) shared channel (SCH) resources to a user equipment (UE). Each of the one or more DL SCH resources may be associated with one of a plurality of hybrid automatic repeat request (HARQ) processes. Each HARQ process may be one of a plurality of HARQ process types. The method may also comprise determining whether one or more of the granted DL SCH resources are usable to send a message based on the HARQ process type of the HARQ process associated with each granted DL SCH resource. The message may be a signaling message. The method may further comprise transmitting the message on the one or more of the granted DL SCH resources when the one or more of the granted DL SCH resources are determined to be usable.

An aspect directed to a network node is disclosed. The network node may comprise means for sending a grant of one or more downlink (DL) shared channel (SCH) resources to a user equipment (UE). Each of the one or more DL SCH resources may be associated with one of a plurality of hybrid automatic repeat request (HARQ) processes. Each HARQ process may be one of a plurality of HARQ process types. The network node may also comprise means for determining whether one or more of the granted DL SCH resources are usable to send a message based on the HARQ process type of the HARQ process associated with each granted DL SCH resource. The message may be a signaling message. The network node may further comprise means for transmitting the message on the one or more of the granted DL SCH resources when the one or more of the granted DL SCH resources are determined to be usable.

An aspect also directed to a network node is disclosed. The network node may comprise a memory and at least one processor coupled to the memory. The memory and the at least one processor may be configured to send a grant of one or more downlink (DL) shared channel (SCH) resources from a network node. Each of the one or more DL SCH resources may be associated with one of a plurality of hybrid automatic repeat request (HARQ) processes. Each HARQ process may be one of a plurality of HARQ process types. The memory and the at least one processor may also be configured to determine whether one or more of the granted DL SCH resources are usable to send a message based on the HARQ process type of the HARQ process associated with each granted DL SCH resource. The message may be a signaling message. The memory and the at least one processor may further be configured to transmit the message on the one or more of the granted DL SCH resources when the one or more of the granted DL SCH resources are determined to be usable.

An aspect directed non-transitory computer-readable medium storing computer-executable instructions for a network node is disclosed. The computer-executable instruction may comprise one or more instruction that cause the UE to send a grant of one or more downlink (DL) shared channel (SCH) resources from a network node. Each of the one or more DL SCH resources may be associated with one of a plurality of hybrid automatic repeat request (HARQ) processes. Each HARQ process may be one of a plurality of HARQ process types. The computer-executable instruction may also comprise one or more instruction that cause the UE to determine whether one or more of the granted DL SCH resources are usable to send a message based on the HARQ process type of the HARQ process associated with each granted DL SCH resource. The message may be a signaling message. The computer-executable instruction may further comprise one or more instruction that cause the network node to transmit the message on the one or more of the granted DL SCH resources when the one or more of the granted DL SCH resources are determined to be usable.

An aspect directed to a method performed by a user equipment (UE) is disclosed. The method may comprise receiving a grant of one or more downlink (DL) shared channel (SCH) resources from a network node. Each of the one or more DL SCH resources may be associated with one of a plurality of hybrid automatic repeat request (HARQ) processes. Each HARQ process may be one of a plurality of HARQ process types. The method may also comprise determining whether a message from the network node carried on one or more DL SCH resources is received correctly. The message may be a signaling message. The method may further comprise sending a HARQ positive acknowledgment (ACK) to the network node when the message is correctly received and when a HARQ process associated with the one or more DL SCH resources has HARQ feedback enabled. The method may yet comprise sending a HARQ negative acknowledgment (NACK) to the network node when the message is incorrectly received and when the HARQ process associated with the one or more DL SCH resources has HARQ feedback enabled.

An aspect directed to a user equipment (UE) is disclosed. The UE may comprise means for receiving a grant of one or more downlink (DL) shared channel (SCH) resources from a network node. Each of the one or more DL SCH resources may be associated with one of a plurality of hybrid automatic repeat request (HARQ) processes. Each HARQ process may be one of a plurality of HARQ process types. The UE may also comprise means for determining whether a message from the network node carried on one or more DL SCH resources is received correctly. The message may be a signaling message. The UE may further comprise means for sending a HARQ positive acknowledgment (ACK) to the network node when the message is correctly received and when a HARQ process associated with the one or more DL SCH resources has HARQ feedback enabled. The UE may yet comprise means for sending a HARQ negative acknowledgment (NACK) to the network node when the message is incorrectly received and when the HARQ process associated with the one or more DL SCH resources has HARQ feedback enabled.

An aspect also directed to a user equipment (UE) is disclosed. The UE may comprise a memory and at least one processor coupled to the memory. The memory and the at least one processor may be configured to receive a grant of one or more downlink (DL) shared channel (SCH) resources from a network node. Each of the one or more DL SCH resources may be associated with one of a plurality of hybrid automatic repeat request (HARQ) processes. Each HARQ process may be one of a plurality of HARQ process types. The memory and the at least one processor may also be configured to determine whether a message from the network node carried on one or more DL SCH resources is received correctly. The message may be a signaling message. The memory and the at least one processor may further be configured to send a HARQ positive acknowledgment (ACK) to the network node when the message is correctly received and when a HARQ process associated with the one or more DL SCH resources has HARQ feedback enabled. The memory and the at least one processor may yet be configured to send a HARQ negative acknowledgment (NACK) to the network node when the message is incorrectly received and when the HARQ process associated with the one or more DL SCH resources has HARQ feedback enabled.

An aspect directed non-transitory computer-readable medium storing computer-executable instructions for a user equipment (UE) is disclosed. The computer-executable instruction may comprise one or more instruction that cause the UE to receive a grant of one or more downlink (DL) shared channel (SCH) resources from a network node. Each of the one or more DL SCH resources may be associated with one of a plurality of hybrid automatic repeat request (HARQ) processes. Each HARQ process may be one of a plurality of HARQ process types. The computer-executable instruction may also comprise one or more instruction that cause the UE to determine whether a message from the network node carried on one or more DL SCH resources is received correctly. The message may be a signaling message. The computer-executable instruction may further comprise one or more instruction that cause the UE to send a HARQ positive acknowledgment (ACK) to the network node when the message is correctly received and when a HARQ process associated with the one or more DL SCH resources has HARQ feedback enabled. The computer-executable instruction may yet comprise one or more instruction that cause the UE to send a HARQ negative acknowledgment (NACK) to the network node when the message is incorrectly received and when the HARQ process associated with the one or more DL SCH resources has HARQ feedback enabled.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
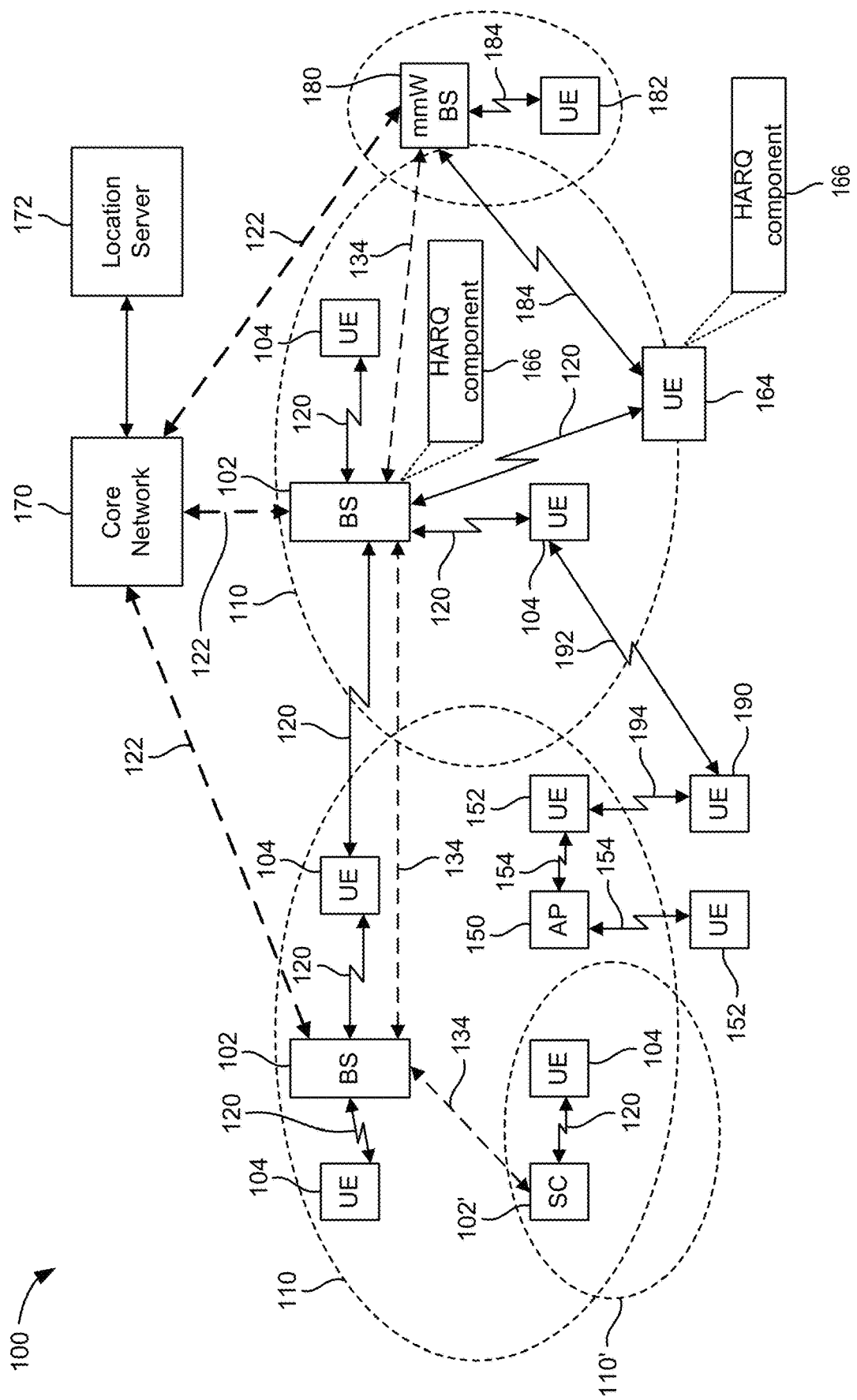
FIG. 1 illustrates an exemplary wireless communications system, according to various aspects.

Various aspects described herein generally relate to hybrid automatic repeat request (HARQ) feedbacks in networks with large propagation delays. An example of a network with large propagation delay is a non-terrestrial network (NTN). Examples of NTNs include networks based on satellites, balloons, aircrafts, unmanned aerial vehicles, etc., which may be categorized into high altitude platform station (HAPS) and satellites. In one or more aspects, a satellite-based NTN may comprise one or more low earth orbit (LEO) and/or one or more medium earth orbit (MEO) satellites. In terrestrial networks (e.g., 5G NR, LTE, etc.), HARQ feedbacks enables data to be transmitted between base stations (e.g., gNB, eNB, etc.) and user equipments (UEs) reliably.

However, in some networks, there can be large propagation delays due to the distances involved between network nodes and user equipments (e.g., between satellites and UEs). To avoid stalling of HARQ processes, in one or more examples, HARQ feedback can be disabled. When the HARQ feedback is disabled, the reliability of transmission/reception of a message may be lower than if the HARQ feedback is enabled. For many types of messages, the lowered reliability may still be sufficient.

But other types messages may require higher message delivery reliability. For example, medium access control (MAC) control element (CE) messages and radio resource control (RRC) messages may require high reliability. For these types of messages, the benefit of the heightened reliability afforded by enabling the feedback may be worth the cost of the stall that may potentially occur.

Thus, one or more techniques are proposed to enable messages (e.g., MAC CE, RRC messages) that require certain level of reliability to be transmitted using proper HARQ processes. That is, techniques are proposed in which different HARQ processes can be selectively used to transmit the messages. In particular, messages that may be deemed important may be transmitted with HARQ feedback and/or retransmission enabled. One technical effect (of which there may be several) of the proposed techniques is that stalls can be avoided when possible and yet ensure sufficient reliability when necessary.

In one or more aspects, a network node (UE) may send (receive) a grant of one or more shared channel resources (uplink and/or downlink resources) associated with a plurality of repeat request processes (e.g., HARQ processes) of various repeat request types. The repeat request types may be based on feedback (e.g., whether feedback is enabled/disabled), retransmission (e.g., whether retransmission is enabled/disabled), etc. A transmitter (UE/network node) may transmit a control message (e.g., RRC message, MAC CE) to the receiver (network node/UE) on the granted (uplink/downlink) shared channel resources that are deemed to be usable. For example, if the control message requires a high reliability of delivery, then the usable shared channel resources may be those associated with repeat request types that have feedback and/or retransmission enabled. By having feedback enabled, the receiver may be able notify whether the control message was correctly received. By having the retransmission enabled, the transmitter may be able to retransmit the control message in the event that the previous transmission failed. On the other hand, if the control message delivery is not of importance, then any granted shared channel resources, including resources that have feedback and/or retransmission disabled, may be deemed usable. In this way, delivery reliability requirements of the control messages may be provided with proper matching channel resources.

These and other aspects are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE), "user terminal" (UT), and "base station" are not intended to be specific or otherwise limited to any particular Radio Access Technology (RAT), unless otherwise noted. In general, such UEs, interchangeable with UTs, may be any wireless communication device (e.g., a mobile phone, router, tablet computer, laptop computer, tracking device, Internet of Things (IoT) device, etc.) used by a user to communicate over a wireless communications network. A UE/UT may be mobile or may (e.g., at certain times) be stationary, and may communicate with a Radio Access Network (RAN). As used herein, the interchangeable terms "UE" and "UT", may also be referred to interchangeably as an "access terminal" or "AT," a "client device," a "wireless device," a "subscriber device," a "subscriber terminal," a "subscriber station," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The term "UE" is typically used in context of terrestrial networks and the term "UT" is typically used in context of satellite-based networks. But as indicated above, these terms may be interchangeably used in the description below.

As mentioned above, in networks that can have potentially a large propagation delay between the transmitter and receiver such as in NTNs, HARQ feedback may be disabled to avoid stalling of HARQ processes. Also as mentioned above, some messaging may require a degree of reliability that a HARQ process with feedback disabled would be unable to provide. To address this issue, it is proposed to enable messages that require high reliability to be transmitted using proper HARQ processes.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies in communication with a UE 182. The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz), which is identified by the International Telecommunications Union (ITU) as a "millimeter wave" band.

With the above aspects in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, or may be within the EHF band.

Communications using the mmW radio frequency band have high path loss and a relatively short range. The mmW base station 180 and the UE 182 may therefore utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

5G supports multi-carrier operation, such as carrier aggregation. In a multi-carrier system, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include a HARQ component 166 that may enable the UE 164 to perform the UE HARQ operations described herein. Similarly, the base stations 102 may include a HARQ component 166 that may enable the base stations 102 to perform the base station HARQ operations described herein. Note that although only UE 164 and one base station 102 in FIG. 1 are illustrated as including a HARQ component 166, any of the UEs and base stations in FIG. 1 may include a HARQ component 166.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

5G uses RF signals at mmW frequencies for wireless communication between network nodes, such as base stations, UEs, vehicles, factory automation machinery, and the like. However, mmW RF signals can be used for other purposes as well, such as weapons systems (e.g., as short-range fire-control radar in tanks and aircraft), security screening systems (e.g., in scanners that detect weapons and other dangerous objects carried under clothing), medicine (e.g., to treat disease by changing cell growth), and the like. In addition, mmW RF signals can be used for environmental sensing, such as object detection and motion sensing.

RF signals at mmW frequencies can provide high bandwidth and a large aperture to extract accurate range, Doppler, and angle information for environment sensing. Using mmW RF signals for environment sensing can provide such features in a compact form factor, such as a small sensing component that can conveniently fit into a handheld device. Such a sensing component (e.g., chip) may be a digital signal processor (DSP), system-on-chip (SoC), or other processing component that can be integrated into another device (a host device), such as a UE, a base station, an IoT device, a factory automation machine, or the like. In an aspect, a sensing component may be, or may be incorporated into, a modem for wireless communication, such as a 5G modem, a 60 GHz WLAN modem, or the like. A device containing a sensing component may be referred to as a host device, an environment sensing device, a sensing device, and the like.

Figure 2:
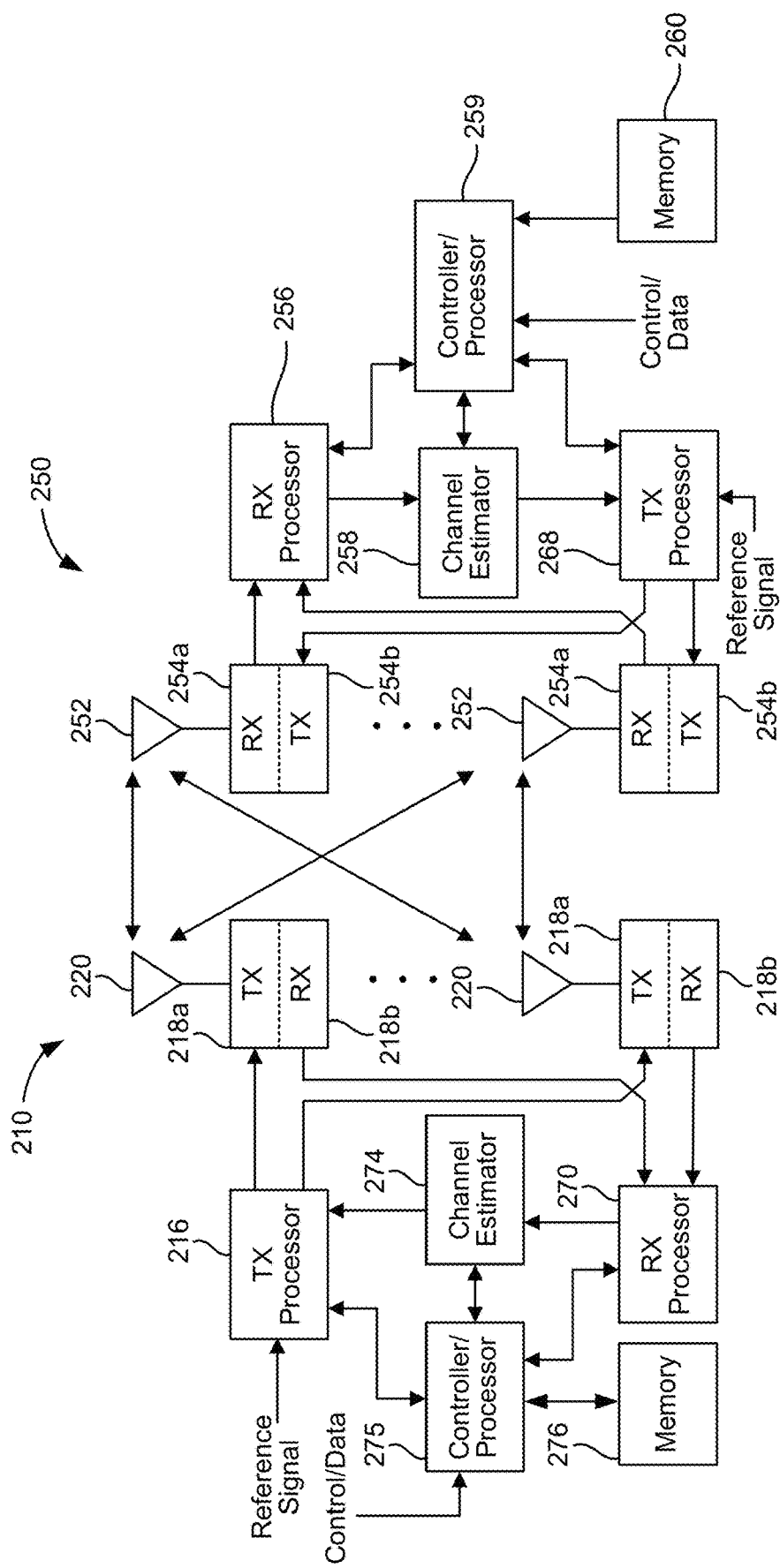
FIG. 2 illustrates an exemplary network node in communication with an exemplary user equipment, according to various aspects.

According to various aspects, FIG. 2 illustrates an exemplary network node 210 (e.g., non-terrestrial network (NTN) node) in communication with an exemplary UE 250. Internet Protocol (IP) packets may be provided to a controller/processor 275. The controller/processor 275 may implement functionality for a radio resource control (RRC) layer, a packet data convergence protocol (PDCP) layer, a radio link control (RLC) layer, and a medium access control (MAC) layer. The controller/processor 275 may provide RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 216 and the receive (RX) processor 270 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing. The TX processor 216 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to one or more different antennas 220 via a separate transmitter 218a. Each transmitter 218a may modulate an RF carrier with a respective spatial stream for transmission.

At the UE 250, each receiver 254a may receive a signal through its respective antenna 252. Each receiver 254a may recover information modulated onto an RF carrier and may provide the information to the RX processor 256. The TX processor 268 and the RX processor 256 may implement Layer-1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 may then convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the network node 210. These soft decisions may be based on channel estimates computed by the channel estimator 258. The soft decisions may then decoded and de-interleaved to recover the data and control signals that were originally transmitted by the network node 210 on the physical channel. The data and control signals may then be provided to the controller/processor 259, which implements Layer-3 and Layer-2 functionality.

The controller/processor 259 can be associated with a memory 260 that stores program codes and data. The memory 260 may be referred to as a computer-readable medium. In the UL, the controller/processor 259 may provide demultiplexing between transport and logical channels, packet reassembly, deciphering, header decompression, and control signal processing to recover IP packets from the core network. The controller/processor 259 may also be responsible for error detection.

Similar to the functionality described in connection with the transmission by the network node 210, the controller/processor 259 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 258 from a reference signal or feedback transmitted by the network node 210 may be used by the TX processor 268 to select the appropriate coding and modulation schemes, and to facilitate spatial processing. The spatial streams generated by the TX processor 268 may be provided to different antenna 252 via separate transmitters 254b. Each transmitter 254b may modulate an RF carrier with a respective spatial stream for transmission.

The UL transmission may be processed at the network node 210 in a manner similar to that described in connection with the receiver function at the UE 250. Each receiver 218b may receive a signal through its respective antenna 220.

Each receiver 218b may recover information modulated onto an RF carrier and may provide the information to a RX processor 270.

The controller/processor 275 can be associated with a memory 276 that stores program codes and data. The memory 276 may be referred to as a computer-readable medium. In the UL, the controller/processor 275 may provide demultiplexing between transport and logical channels, packet reassembly, deciphering, header decompression, control signal processing to recover IP packets from the UE 250. IP packets from the controller/processor 275 may be provided to the core network. The controller/processor 275 may also be responsible for error detection.

In the UE 250, the transmitter 254b and the receiver 254a may together form a transceiver 254. In the network node 210, the transmitter 218a and the receiver 218b may together form a transceiver 218.

The network node 210 and the UE 250 may be configured to implement the proposed preamble format allocation approach. In this approach, the network node 210 (e.g., gNB, cell) may allocate a plurality of PRACH preamble formats and transmit or broadcast the allocated preamble formats in one or more SSBs. The SSBs may be periodically broadcasted. The UE may receive the allocated preamble formats in the one or more SSBs. To perform initial access, the UE may choose a preamble format from among the plurality of allocated preamble formats based on one or more metrics (e.g., RSRP, SNR, SINR, BER, etc.), and transmit the preamble accordingly.

As mentioned, disabling HARQ feedbacks may avoid stalling of HARQ processes, but may also result in being unable to meet some more stringent reliability requirements. To address such issues, a device, such as a UE or a network node, may support multiple HARQ processes, and the HARQ processes may be configured with different combinations of HARQ parameters.

That is, a UE may support N HARQ processes (e.g., 16), i.e., the UE may support N HARQ buffers. Each HARQ process may be identified with a HARQ process ID, e.g., 0 ... N−1. M out of N HARQ processes may have HARQ feedback disabled, in which M≥0. In an aspect, the value of M may be fixed (e.g., to 1 or 0). Though there is no HARQ feedback, HARQ retransmission may happen. For example, the transmitter may blindly retransmit data some number of times.

A HARQ-less process may also be defined. In this process, HARQ feedback is disabled and no HARQ retransmission is considered. This is a one-shot transmission. When using HARQ-less process transmission, reliability may be achieved by higher layer transmission. In this aspect, HARQ may be a physical layer process.

In an aspect, another HARQ process type may be defined. In this aspect, HARQ feedback may be enabled and the HARQ retransmission may be disabled. For an uplink (UL) HARQ process, the UE may expect only positive HARQ feedback (i.e., ACK) feedback in the downlink. For a downlink (DL) HARQ process, the UE may send only the positive HARQ feedback in the uplink.

The HARQ feedback may be enabled or disabled dynamically by e.g., radio network temporary identifier (RNTI) to be used, a HARQ process ID, a rate matching/resource indicator, etc. The higher layer may be made aware of the HARQ feedback to decide whether to initiate retransmission. For example, mapping of logical channel ID and HARQ process may be defined and the radio link control (RLC) layer may decide to retransmit based on the HARQ feedback.

In an aspect, each HARQ process may be defined as being a particular HARQ process type, which may be defined based on the HARQ feedback (whether HARQ feedback is enabled or disabled) and based on the HARQ retransmission (whether HARQ retransmission is enabled or disabled) configuration. Note that in the uplink, a decoding result—e.g., whether a network node has correctly decoded the uplink transmission from the UE (e.g., a control message)—may be indicated to the UE. Such indication of decoding result may be viewed as HARQ feedback in an aspect. In an aspect, in the uplink (e.g., for UL SCH), the control signal or message that indicates feedback status and schedule information may be the same since both may come from the network to the UE. But in the downlink (e.g., for DL SCH) the feedback status is from the UE to the network and the control signal/message is from the network to the UE. It will be appreciated that the various HARQ process types may be indicated in one or more bits in one or more control messages between the network node and the user equipment. For ease of reference, the following HARQ transmission types may be defined:

First HARQ process type—HARQ feedback enabled, HARQ retransmission enabled;
Second HARQ process type—HARQ feedback enabled, HARQ retransmission disabled;
Third HARQ process type—HARQ feedback disabled, HARQ retransmission enabled;
Fourth HARQ process type—HARQ feedback disabled, HARQ retransmission disabled (e.g., HARQ-less type).

In a UE that supports a number of HARQ processes, each HARQ process n (n=0 ... N−1) may be configured as one of the four HARQ process types. The configuration may be set within the UE, e.g., as defaults such as in factory setting. Alternatively or in addition thereto, the network may configure one or more of the HARQ processes (e.g., through downlink control information (DCI) messages, RRC messages, etc.). In an aspect, for at least one HARQ process, the network configuration of the HARQ process may override any previous configuration of the at least one HARQ process.

During operation, a network node (e.g., NTN node) may grant UL shared channel (SCH) resources to a UE, and the UL SCH resources may be associated with various HARQ processes. That is, the UL SCH resources may be associated with various HARQ process IDs. If the UE has uplink messages to transmit, it may determine whether the UL SCH resources are usable to send the message. If there are usable resources, the UE may transmit the message on the UL SCH resources deemed usable. On the other hand, if there are no such resources available, then the UE may send a scheduling request (SR) to request an UL grant associated with the desired HARQ processes.

The usability of the resources may be determined based on the HARQ process types of the HARQ processes of the associated UL SCH resources. For example, if the message is such that delivery to the network is very important, then the UE may search for UL SCH resources that have both HARQ feedback and retransmission enabled (i.e., first HARQ process type). At the opposite end of the spectrum, if the message is not important at all, then HARQ processes of any HARQ process type—including ones that have both HARQ feedback and retransmission disabled (i.e., fourth HARQ process type)—may suffice. Of course, there may be messages in between the two extremes (e.g., second and third HARQ process types).

In general, signaling messages are given higher priorities than user plane messages. In other words, it may be important that signaling messages be delivered with some raised level of reliability relative to user plane messages. Examples of such messages include RRC and MAC CE messages. In one or more aspects, the UE may enable such messages to be transmitted using proper HARQ processes.

An RRC message transmitted through signal radio bearers (SRBs) has higher priority than data transmitted through data radio bearers (DRBs). The following are some (not necessarily exhaustive) options that RRC messages may be transmitted using HARQ processes. HARQ processes of which HARQ process types are deemed usable may depend on which RRC option is implemented:

1. RRC messages in SRBs may only use HARQ processes that have both HARQ feedback and HARQ retransmission enabled. In other words, only the HARQ processes of the first HARQ process type may be deemed usable.
2. RRC messages in SRB1/SRB2/SRB3 or RRC messages in dedicated control channels (DCCHs) may only use HARQ processes that has both HARQ feedback and HARQ retransmission enabled (first HARQ process type usable). All other RRC messages (e.g., RRC messages in common control channel (CCCH) or CCCH1 or RRC messages in other SRBs (e.g., SRB0) may use any available HARQ process at time of transmission (first, second, third, and/or fourth HARQ process types usable).
3. RRC messages (e.g., in SRBs) may use any HARQ process but HARQ feedback is considered to be enabled and HARQ retransmission is considered to be disabled (second HARQ process type usable):
   In case of SRB0, RRC layer may be provided with HARQ feedback (PHY layer) for possible retransmission from RRC. When random access channel (RACH) process is used, the random access may be restarted with Msg1 or MsgA with preamble.
   During random access, an exception may be made such that MsgA or Msg3 can support physical uplink shared channel (PUSCH) retransmission.
   In case of SRB1, SRB2, or SRB3, RLC may be indicated with the HARQ feedback for possible retransmission.

MAC CE message may be transmitted without any uplink data based on the HARQ process. The following are some (not necessarily exhaustive) options that MAC CE messages may be transmitted using HARQ processes. HARQ processes of which HARQ process types are deemed usable may depend on which MAC CE option is implemented:

1. MAC CE messages may only use HARQ processes that has both HARQ feedback and HARQ retransmission enabled (first HARQ process type usable):
   In such cases, logical channel prioritization may not include MAC CE for a HARQ process that has HARQ feedback/transmission disabled, i.e., may not include MAC CEs for a HARQ process of fourth HARQ process type.
2. MAC CEs may use a same HARQ process that is used by any data in a logical channel when the MAC CE is sent together with the data:
   In such cases, if a MAC CE triggers an SR, then the SR may indicate the requested HARQ process for the MAC CE. This implies that the SR or the SR configuration may be chosen at the MAC layer such that the UE requests the HARQ process type desired for the MAC CE.
3. Rules may be defined for which MAC CE uses which HARQ process. That is, rules may define that different MAC CEs may use different HARQ process types (first, second, third, and/or fourth HARQ process types). The following are some (not necessarily exhaustive) rules:
   When a UE has UL SCH resources, some MAC CEs (e.g., buffer status report (BSR) MAC CE, power headroom report (PHR) MAC CE, etc.) that have higher priority than UL data may only use HARQ process that has HARQ feedback enabled and/or HARQ retransmission enabled (first, second, and/or third HARQ process types usable).
   MAC CEs that start retransmission timer after transmission, may use any HARQ process (first, second, third, and/or fourth HARQ process types usable) or HARQ process that has HARQ feedback and/or retransmission disabled (first, second, and/or third HARQ process types usable). As an illustration, BSR MAC CE may have higher priority than UL data, but periodic BSR is typically triggered upon expiration of BSR retransmission timer. In such instances, BSR MAC CE may use any HARQ processes.
   Static and/or semi-static rules may be defined for each MAC CE. For DL MAC CEs, HARQ feedback and retransmission may be enabled (first HARQ process type usable). For UL, some MAC CEs (e.g., cell-RNTI (C-RNTI) MAC CE) may be configured to use HARQ processes with HARQ feedback and/or retransmission enabled (first, second, and/or third HARQ process types usable).

In one example, "static" rules may be analogized to a default or factory set configuration of rules, and "semi-static" rules may be analogized to configuration of rules provided by the network, e.g., through DCI, RRC, etc. In an aspect, for one or more of the HARQ process rules, semi-static configuration of the rules may override previous configuration of the rules.

Figure 3:
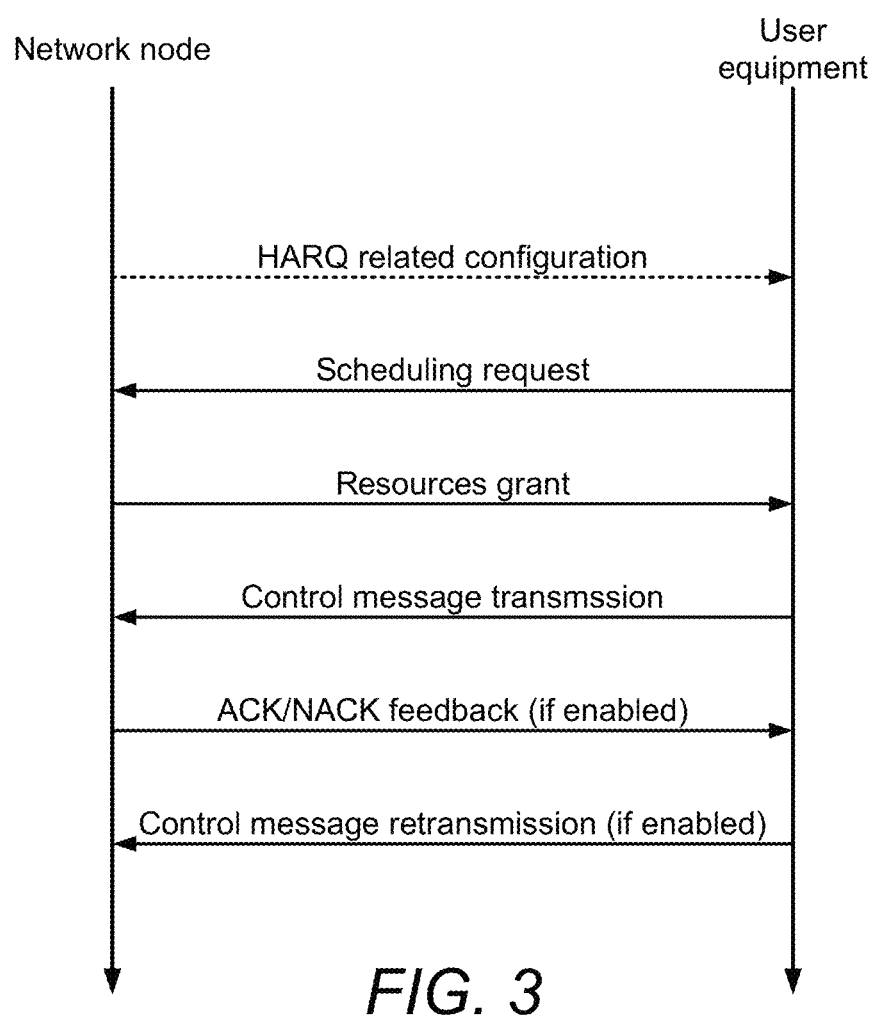
FIG. 3 illustrates an example signaling between a network node and a user equipment, according to various aspects.

FIG. 3 illustrates an example signaling between the network node and the user equipment. Briefly, the network node may send HARQ related configuration message (details below) to the UE, and the UE may apply the HARQ related configurations. The UE may send a scheduling request (SR) to the network node when it has uplink messages, including signaling messages, to send. The network node may grant the UE with UL SCH resources in response. The UE may send a signaling message, or any message that requires high reliability, to the network node. If HARQ feedback is enabled, the network node may send ACK or NACK depending on whether it correctly or incorrectly receives the message. If HARQ retransmission is enabled, then the UE may retransmit the message if NACK feedback is received. Details are provided with respect to FIGS. 4 and 5.

Figure 4:
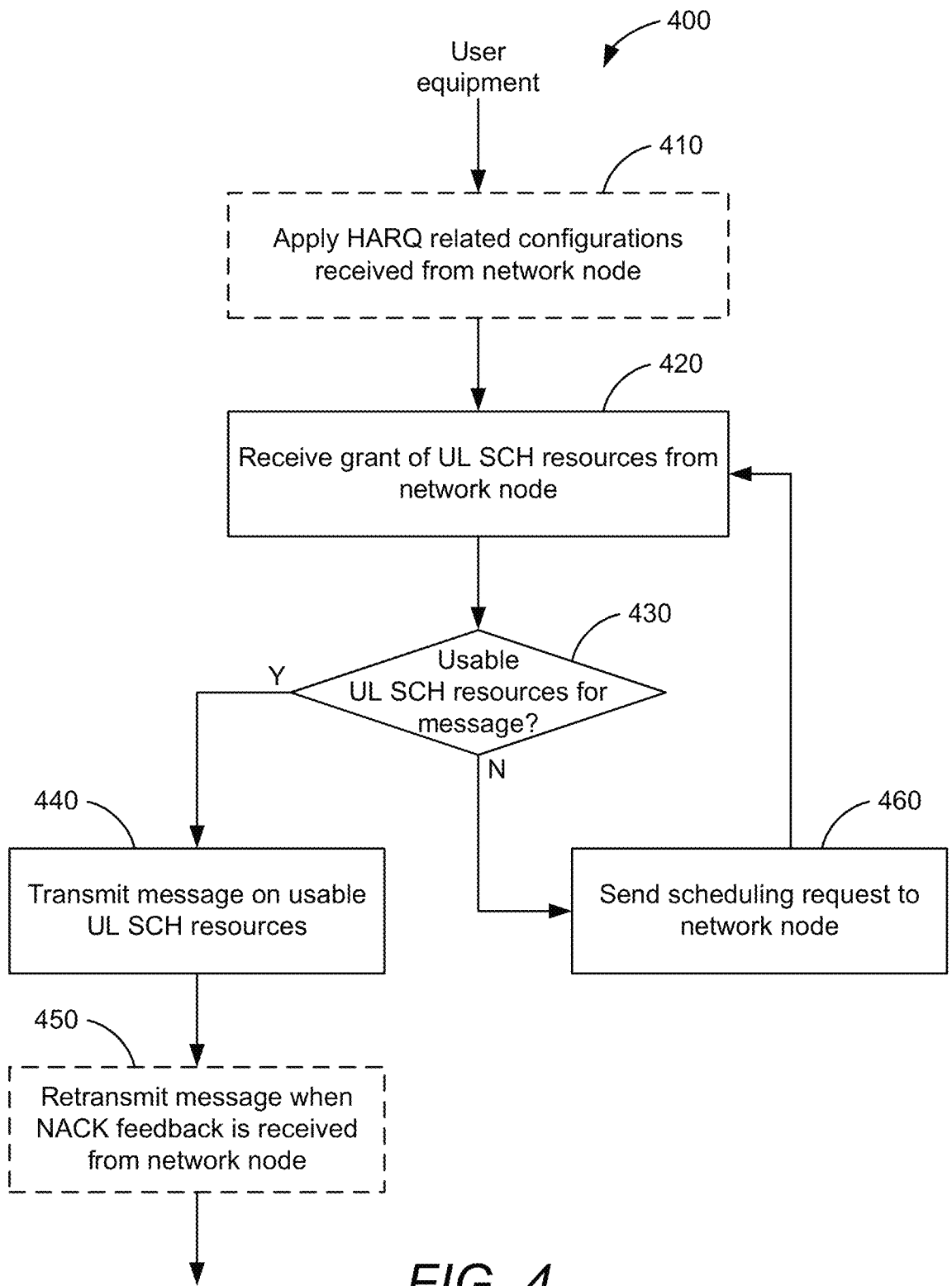
FIG. 4 illustrates a flow chart of an exemplary method performed by a user equipment, according to various aspects.

FIG. 4 illustrates an exemplary method 400 performed by a UE such as a UE 210. At block 410, the UE may apply HARQ related configurations received from a network node (e.g., satellite 110, coordinator 180, NTN 210). The HARQ related configurations may be received through DCI and/or RRC messages.

Note that the UE may support a plurality of HARQ processes (e.g., 16 HARQ processes). Thus, in one aspect, the HARQ related configurations may include HARQ process type configuration of one or more of the plurality of HARQ processes. For example, different HARQ processes may have different combinations of having their HARQ feedback being enabled/disabled and HARQ retransmissions being enabled/disabled, i.e., some HARQ processes may be configured as first HARQ process type, others may be configured as second HARQ process type, and so on.

In another aspect, configurations may be defined for mapping of RRC messages and corresponding usable UL SCH resources. That is, for one or more RRC messages, the HARQ related configurations may include configurations of how the UE should determine the usable UL SCH resources based on the HARQ process types of the HARQ processes associated with the UL SCH resources. For example, in one option (RRC option 1 above), only the HARQ processes of the first HARQ process type may be deemed usable. RRC options 2 and 3 indicated above as well as others may be defined for RRC messages.

In a further aspect, configurations may be defined for mapping of MAC CE messages and corresponding usable UL SCH resources. That is, for one or more MAC CE messages, the HARQ related configurations may include configurations of how the UE should determine the usable UL SCH resources based on the HARQ process types of the HARQ processes associated with the UL SCH resources. For example, in one option (MAC CE option 1 above), only the HARQ processes of the first HARQ process type may be deemed usable. MAC CE options 2 and 3 indicated above as well as others may be defined for MAC CE messages.

Note that block 410 is dashed to indicate that it is optional. That is, the UE may be statically configured with HARQ related configurations. If and when the UE receives the HARQ related configurations, the statically configured HARQ related configurations may be overridden. Also, if block 410 is performed, it is not necessary that the UE receive all of the HARQ related configurations. For example, the received HARQ related configurations may specify the HARQ process types of some HARQ process, but not others.

In block 420, the UE may receive a grant of one or more UL SCH resources from the network node. Each granted UL SCH resource may be associated with a HARQ process, which may be one of a number (e.g., 16) of HARQ processes supported by the UE. Each HARQ process may be one of a number (e.g., 4) of HARQ process types. For example, each HARQ process may be a first, second, third, or fourth HARQ process type.

It is indicated above that the HARQ process type of the HARQ processes may be statically and/or semi-statically configured. But in another aspect, the HARQ process type may be configured dynamically, e.g., in a DCI message. For example, any one or more of a radio network temporary identifier (RNTI) to be used, the HARQ process ID, and a rate matching/resource indicator may indicate the HARQ process type.

In block 430, the UE may determine whether one or more of the granted UL SCH resources are usable to send a message based on the HARQ process type of the HARQ process associated with each granted UL SCH resource. In other words, the UE may determine whether any, i.e., some or all, of the granted UL SCH resources are usable in block 430. The message may be a signaling message such as RRC or MAC CE message.

In one RRC option (e.g., RRC option 1), the message may be an RRC message for transmission through any of the SRBs (e.g., SRB0, SRB1, SRB2, SRB3). In this option, the UE may determine that that the one more of the granted UL SCH resources are usable when each of the one or more of the granted UL SCH resources is associated with a HARQ process of the first HARQ process type, i.e., a HARQ process that has both HARQ feedback and HARQ retransmission enabled.

In another RRC option (e.g., RRC option 2), the message may be an RRC message maybe for transmission through SRB1, SRB2, or SRB3, or may be in a DCCH. For such RRC messages, the UE may determine that that the one more of the granted UL SCH resources are usable when each of the one or more of the granted UL SCH resources is associated with a HARQ process of the first HARQ process type, i.e., a HARQ process that has both HARQ feedback and HARQ retransmission enabled. For other RRC messages, i.e., RRC messages in CCCH, CCCH1, or SRB0, the UE may determine that the one or more UL SCH resources are usable regardless of the HARQ process types of the associated HARQ processes. That is, any available UL SCH resources may be deemed usable.

In a further RRC option (e.g., RRC option 3), the message may be an RRC message, e.g., in any of the SRBs. For such RRC messages, the UE may determine that that the one more of the granted UL SCH resources are usable when each of the one or more of the granted UL SCH resources is associated with a HARQ process of the second HARQ process type, i.e., a HARQ process that has HARQ feedback enabled and HARQ retransmission disabled.

In this further RRC option, if the message is an RRC message in SRB0, the RRC layer may be provided with the HARQ feedback. Based on the HARQ feedback (e.g., NACK), retransmission may occur at the RRC layer. When random access channel (RACH) process is used, the random access may be restarted with Msg1 or MsgA with preamble. During random access, an exception may be made such that MsgA or Msg3 can support physical uplink shared channel (PUSCH) retransmission. If the message is an RRC message in SRB1, SRB2, or SRB3, the RLC layer may be indicated with the HARQ feedback for possible retransmission.

In one MAC CE option (e.g., MAC CE option 1), the UE may determine that that the one more of the granted UL SCH resources are usable when each of the one or more of the granted UL SCH resources is associated with a HARQ process of the first HARQ process type, i.e., a HARQ process that has both HARQ feedback and HARQ retransmission enabled. The MAC CE message may be transmitted without any UL data being transmitted on the usable UL SCH resources. For example, the UL data may require HARQ processes of other types (e.g., second, third, or fourth). In an aspect, if it is determined that there are no usable UL SCH resources for the MAC CE, then UL data only may be transmitted on the one or more UL SCH resources.

In another MAC CE option (e.g., MAC CE option 2), the MAC CE message may be sent along with UL data. In this MAC CE option, the UE may determine whether the one or more of the granted UL SCH resources are usable based on HARQ process type requirements of the UL data.

In an aspect, an SR or an SR configuration may be chosen at a MAC layer of the UE. The SR or the SR configuration may indicate a HARQ process requirement for the MAC CE message.

In a further MAC CE option (e.g., MAC CE option 3), rules may be applied to determine the usability of the UL SCH resources. The rules may be configured statically (e.g., factory setting) or semi-statically (e.g., RRC messages).

One rule may be such that when the MAC CE message has higher priority than the UL data, the UE may determine that any one or more available granted UL SCH resources are usable. That is, the one or more of the granted UL SCH resources may be deemed usable regardless of the HARQ process types of the associated HARQ processes. BSR MAC CE and PHR MAC CE messages may be examples of such messages.

Another rule may be such that when the MAC CE message is a message in which a MAC CE retransmission timer is started after transmission thereof, the UE may determine that the one or more of the granted UL SCH resources are usable regardless of the HARQ process types of the associated HARQ processes, i.e., any one or more available granted UL SCH resources may be deemed to be usable.

There may also be one or more HARQ-MAC CE matching rules in which each matching rule specifies a mapping of a MAC CE type with acceptable HARQ process types. The acceptable HARQ process types may be any combination of the first, second, third and fourth HARQ process types. In this instance, the UE may determine the MAC CE type of the MAC CE message. The UE may then determine that the one or more UL SCH resources are usable when each of the one or more of the granted UL SCH resources is associated with a HARQ process of the HARQ process type included in the acceptable HARQ process types corresponding to the MAC CE type of the MAC CE message.

In block 440, when it is determined that the one or more of the granted UL SCH resources are usable (Y branch from block 430), the UE may transmit the message (RRC or MAC CE message) on the usable UL SCH resources, i.e., on the one or more granted UL SCH resources determined to be usable.

In block 450, the UE may retransmit the message when a NACK feedback is received from the network. In one aspect, if the HARQ retransmission is enabled, the retransmission may occur.

In another aspect, even when the HARQ retransmission is disabled, when the NACK HARQ feedback is received, the feedback may be provided to a higher layer such as the RRC or the RLC layer. For example, when the PHY layer of the UE informs the RRC layer that the NACK feedback corresponding to the RRC message was received, the RRC layer may retransmit the message. The PHY layer may also inform the RRC layer that no feedback was received within a HARQ timeout period. In this instance, the RRC layer may also retransmit the message. The RLC layer may behave similarly when it is informed of the HARQ NACK feedback and/or of the HARQ timeout occurrence.

Block 450 is dashed to indicate that retransmission may not happen every time when the NACK feedback is received. For example, the HARQ retransmission may be disabled, and the higher layers may not be configured to retransmit upon being informed of the NACK feedback and/or of the HARQ timeout occurrence. As another example, the HARQ process type may be the fourth HARQ process type, i.e., HARQ-less process type.

In block 460, when it is determined that the one or more UL SCH resources are not unusable (N branch from block 430), i.e., when none of the granted UL SCH resources are usable to send the message, the UE may send a scheduling request (SR) to the network node for UL SCH resources associated with HARQ processes of proper HARQ process types. In one aspect, recall from above when the message is a MAC CE message, the MAC layer may choose the SR or SR configuration indicating the HARQ process requirement for the MAC CE. In block 460, the chosen SR or SR configuration may be sent.

Figure 5:
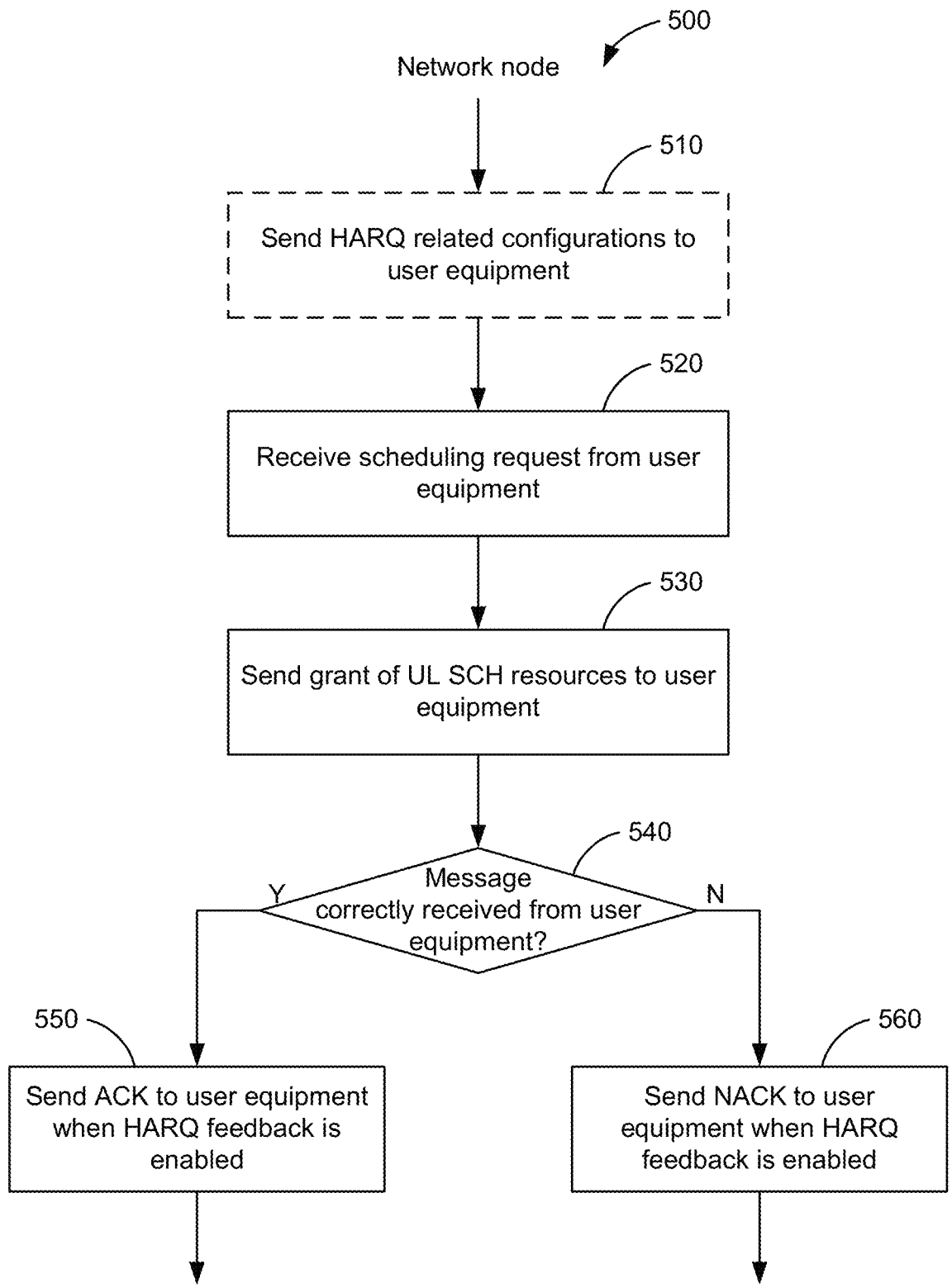
FIG. 5 illustrates a flow chart of an exemplary processes performed by a network node, according to various aspects.

FIG. 5 illustrates an exemplary method 500 performed by a network node such as a network node 210. In an aspect, the network node performing the method 500 may be a non-terrestrial network (NTN) node such as a satellite.

At block 510, the network node may send HARQ related configurations to a UE (e.g., UE 130, 210). Details of the HARQ related configurations are discussed above with respect to block 410 of FIG. 4. Note that block 510 is dashed to indicate that it is optional. That is, the network node may or may not send the HARQ related configurations. Also, when block 510 is performed, it is not necessary that the network node send all of the HARQ related configurations.

In block 520, the network node may receive a scheduling request (SR) for UL SCH resources from the UE. In an aspect, the SR may indicate HARQ process requirements for the UL SCH resources.

In response, in block 530, the network node may send a grant of UL SCH resources to the UE. Each granted UL SCH resource may be associated with a HARQ process, which may be one of a number (e.g., 16) of HARQ processes supported by the UE and also supported by the network node. Each HARQ process may be one of a number (e.g., 4) of HARQ process types. The UL SCH resources may be granted in consideration of the HARQ process requirements included in the SR request. That is, when possible, the UL SCH resources may be associated with HARQ processes of the requested HARQ process type.

Recall from above that the HARQ process type of the HARQ processes may be statically and/or semi-statically configured. Also recall that the HARQ process type may be configured dynamically. For example, the network node may send a DCI message to dynamically configure the HARQ process types. For example, any one or more of a radio network temporary identifier (RNTI) to be used, the HARQ process ID, and a rate matching/resource indicator may be included in the DCI to indicate the HARQ process type.

In block 540, when the network node receives a message on one or more granted UL SCH resources from the UE, the network node may determine whether or not the message is correctly received. The message may be a signaling message such as an RRC or a MAC CE message.

In block 550, if the message is correctly received (Y branch from block 540), the network node may send a positive acknowledgment (ACK) to the user equipment if the granted UL SCH resources carrying the message are associated with a HARQ process that has HARQ feedback enabled. In other words, the ACK may be sent if the associated HARQ process is the first or the second HARQ process type.

On the other hand, in block 560, if the message is not correctly received (N branch from block 540), the network node may send a negative acknowledgment (NACK) to the user equipment if the granted UL SCH resources carrying the message are associated with a HARQ process that has HARQ feedback enabled.

Going back to block 550, note that in an aspect, when the network node correctly receives the message, it may then proceed to sending a new UL grant to the user equipment. In such instances, sending anything other than a NACK to the user equipment may be viewed as sending and ACK.

Figure 6:
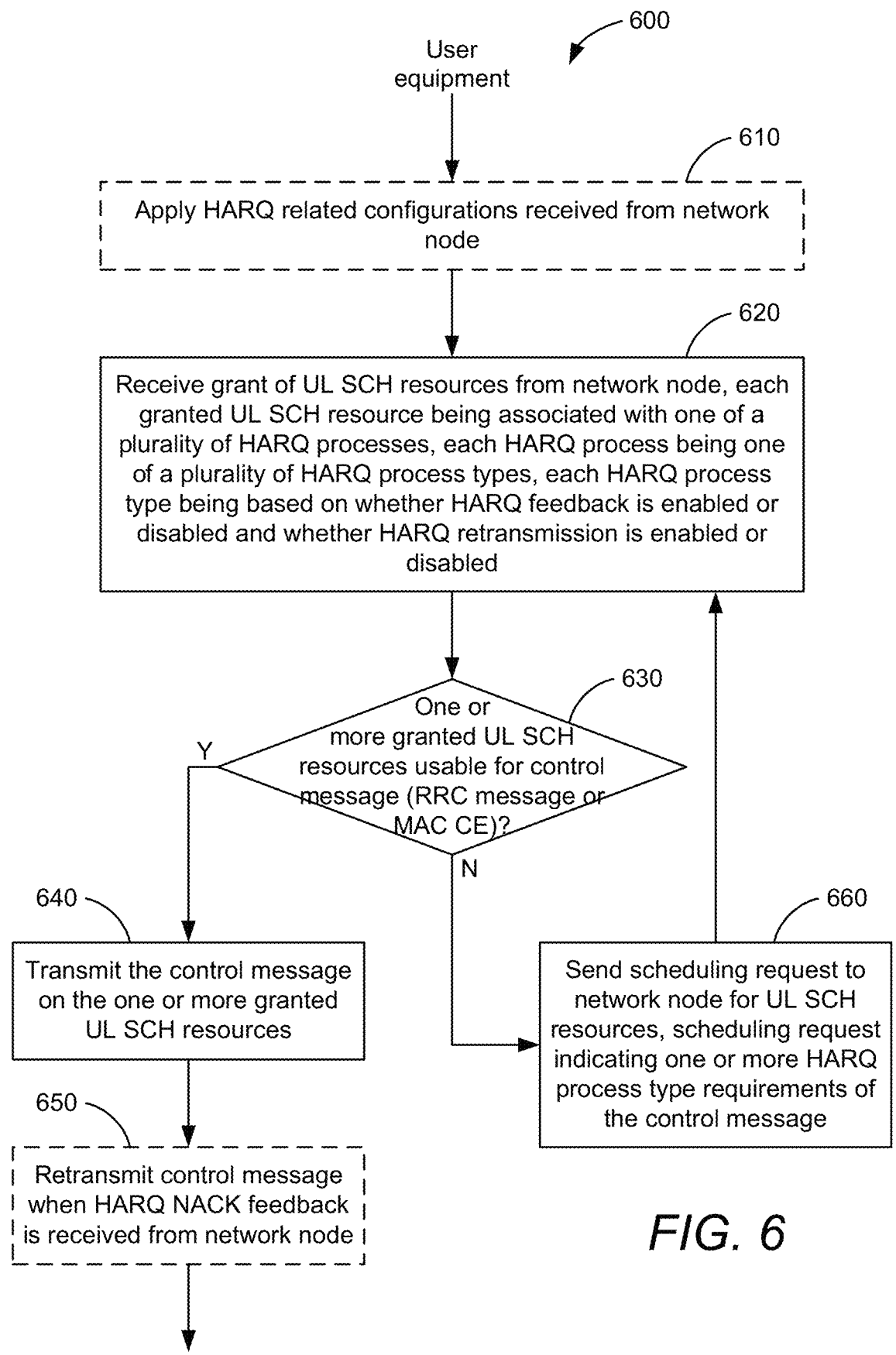
FIGS. 6 and 7 illustrate flow charts of an exemplary method performed by a user equipment, according to various aspects.

FIG. 6 illustrates another exemplary method 600 performed by a UE such as a UE 210. In an aspect, method 600 may be viewed as a version of the method 400 of FIG. 4. In method 600, control messages (e.g., RRC message, MAC CE, etc.) may be transmitted. In an aspect, control messages may be messages that include data for establishing and/or maintaining the communication between the UE and the network. Control messages transmitted from the UE to the network node may be referred to as UL control messages, and control messages transmitted from the network node to the UE may be referred to as DL control messages.

At block 610, the UE may apply HARQ related configurations received from a network node (e.g., satellite 110, coordinator 180, NTN 210). The HARQ related configurations may be received through DCI and/or RRC messages. Details of the HARQ related configurations are discussed above with respect to block 410 of FIG. 4.

Again, block 610 is indicated to be optional. That is, the UE may be statically configured with HARQ related configurations. If and when the UE receives the HARQ related configurations, the statically configured HARQ related configurations may be overridden. Also, if block 610 is performed, it is not necessary that the UE receive all of the HARQ related configurations.

In block 620, the UE may receive a grant of one or more UL SCH resources from the network node. Alternatively or in addition thereto, the UE may receive a grant of one or more DL SCH resources from the network node. Each granted SCH (UL or DL) resource may be associated with a HARQ process, which may be one of a number (e.g., 16) of HARQ processes supported by the UE. Each HARQ process may be one of a number (e.g., 4) of HARQ process types. The HARQ process types may be defined based on whether the HARQ feedback is enabled or disabled and whether the HARQ retransmission is enabled or disabled. For example, each HARQ process may be a first, second, third, or fourth HARQ process type as described above.

The HARQ process type of the HARQ processes may be statically and/or semi-statically configured. Alternatively, or in addition thereto, the HARQ process type may be configured dynamically, e.g., in a DCI message. For example, any one or more of a radio network temporary identifier (RNTI) to be used, the HARQ process ID, and a rate matching/resource indicator may indicate the HARQ process type.

In block 630, the UE may determine whether one or more of the granted UL SCH resources are usable to send a control message (e.g., RRC message, MAC CE, etc.) based on the HARQ process type of the HARQ process associated with the one or more granted UL SCH resources. In other words, the UE may determine whether any, i.e., some or all, of the granted UL SCH resources are usable in block 630.

When the control message is an RRC message, different options of determining whether the one or more granted ULSCH resources are usable are discussed above with respect to block 430. For example, in a first RRC option (e.g., RRC option 1), the control message—i.e., the RRC message—may be deemed important such that only the most reliable transmission is used. In this option, the UE may determine that that the one more of the granted UL SCH resources are usable when the one or more granted UL SCH resources are associated with a HARQ process that has both HARQ feedback and HARQ retransmission enabled, i.e., is a HARQ process of the first HARQ process type.

In a second RRC option (e.g., RRC option 2), some RRC messages may be deemed sufficiently important so as utilize the most reliable transmission, while other RRC messages may use any UL SCH resources. In one aspect, an RRC message for transmission through SRB1, SRB2, or SRB3, or may in a DCCH may be deemed sufficiently important. For such RRC messages, the UE may determine that that the one more of the granted UL SCH resources are usable when the one or more granted UL SCH resources are associated with a HARQ process of the first HARQ process type. On the other hand, for other RRC messages, (e.g., RRC messages in CCCH, CCCH1, or SRB0), the UE may determine that the one or more UL SCH resources are usable regardless of the HARQ process types of the associated HARQ processes. That is, any available UL SCH resources may be deemed usable.

In a third RRC option (e.g., RRC option 3), higher layers (e.g., RRC, RLC, MAC, etc.) may be relied upon to retransmit the control message rather than using the PHY layer HARQ retransmission. In this instance, the UE may determine that the one or more granted resources are usable if the one or more granted resources are associated with HARQ processes that have HARQ feedback enabled and HARQ retransmission disabled, i.e., associated with HARQ processes of the second HARQ process type.

In this third RRC option, if the RRC message is in SRB0, the RRC layer may be provided with the HARQ feedback. Based on the HARQ feedback (e.g., NACK), retransmission may occur at the RRC layer. When random access channel (RACH) process is used, the random access may be restarted with Msg1 or MsgA with preamble. During random access, an exception may be made such that MsgA or Msg3 can support physical uplink shared channel (PUSCH) retransmission. If the message is an RRC message in SRB1, SRB2, or SRB3, the RLC layer may be indicated with the HARQ feedback for possible retransmission.

Various options are also available when the control message is a MAC CE, which are also discussed above with respect to block 430. For example, in a first MAC CE option (e.g., MAC CE option 1), the MAC CE may be deemed important so as to use the most reliable transmission. In this first MAC CE option, the UE may determine that that the one more of the granted UL SCH resources are usable when the one or more granted UL SCH resources are associated with a HARQ process of the first HARQ process type, i.e., a HARQ process that has both HARQ feedback and HARQ retransmission enabled. The MAC CE message may be transmitted without any UL data being transmitted on the usable UL SCH resources. For example, the UL data may require HARQ processes of other types (e.g., second, third, or fourth). In an aspect, if it is determined that there are no usable UL SCH resources for the MAC CE, then UL data only may be transmitted on the one or more UL SCH resources.

In a second MAC CE option (e.g., MAC CE option 2), the MAC CE message may be sent along with UL data. In this MAC CE option, the UE may determine whether the one or more of the granted UL SCH resources are usable based on HARQ process type requirements of the UL data. An SR or an SR configuration may be chosen at a MAC layer of the UE. The SR or the SR configuration may indicate a HARQ process requirement for the MAC CE message.

In a third MAC CE option (e.g., MAC CE option 3), various rules may be applied to determine the usability of the UL SCH resources. The rules may be configured statically (e.g., factory setting) or semi-statically (e.g., RRC messages).

One rule may be such that when the MAC CE message has higher priority than the UL data, the UE may determine that any one or more available granted UL SCH resources are usable. That is, the one or more of the granted UL SCH resources may be deemed usable regardless of the HARQ process types of the associated HARQ processes. BSR MAC CE and PHR MAC CE messages may be examples of such messages.

Another rule may be such that when the MAC CE message is a message in which a MAC CE retransmission timer is started after transmission thereof, the UE may determine that the one or more of the granted UL SCH resources are usable regardless of the HARQ process types of the associated HARQ processes, i.e., any one or more available granted UL SCH resources may be deemed to be usable.

There may also be one or more HARQ-MAC CE matching rules in which each matching rule specifies a mapping of a MAC CE type with acceptable HARQ process types. The acceptable HARQ process types may be any combination of the first, second, third and fourth HARQ process types. In this instance, the UE may determine the MAC CE type of the MAC CE message. The UE may then determine that the one or more UL SCH resources are usable when each of the one or more of the granted UL SCH resources is associated with a HARQ process of the HARQ process type included in the acceptable HARQ process types corresponding to the MAC CE type of the MAC CE message.

In block 640, when it is determined that the one or more granted UL SCH resources are usable (Y branch from block 630), the UE may transmit the control message (RRC message or MAC CE) on the usable UL SCH resources, i.e., on the one or more granted UL SCH resources determined to be usable.

Figure 7:
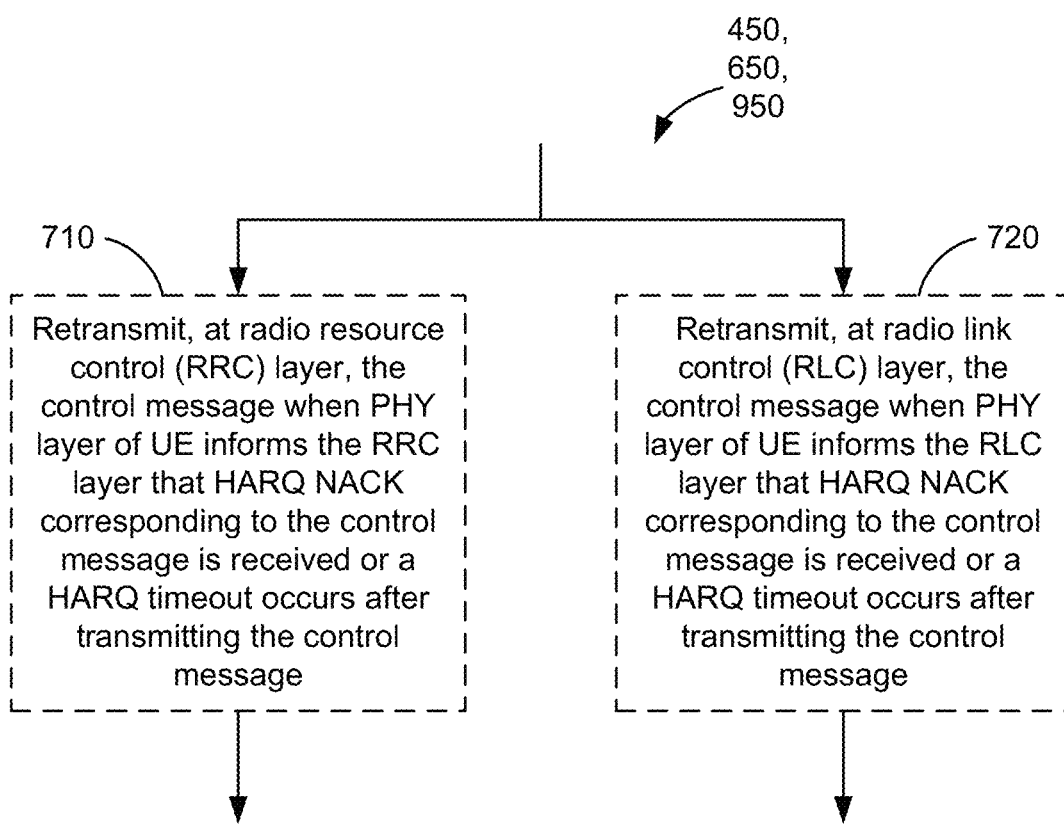

In block 650, the UE may retransmit the message when a NACK feedback is received from the network. In one aspect, if the HARQ retransmission is enabled, the retransmission may occur. FIG. 7 illustrates an example flow chart of implementing block 650. FIG. 7 illustrates a way of retransmitting the RRC message when a HARQ NACK (at the PHY layer) is received from the network. In this instance, the original one or more granted UL SCH resources may be associated with HARQ processes of the second HARQ process type, i.e., with HARQ feedback enabled and with HARQ retransmission disabled. The retransmission may occur at higher layers such as the RRC or RLC layer.

In block 710, the UE may retransmit, at the RRC layer, the RRC message when the PHY layer of the UE informs the RRC layer that a HARQ negative acknowledgment (NACK) corresponding to the earlier transmitted RRC message is received. Alternatively, or in addition thereto, the UE may retransmit at the RRC layer if a HARQ timeout occurs subsequent to transmitting the RRC message on the one or more granted UL SCH resources. In an aspect, such RRC messages may be SRB0 RRC messages.

Alternatively, or in addition thereto, in block 720, the UE may retransmit, at the radio link control (RLC) layer, the RRC message when the PHY layer of the UE informs the RLC layer that a HARQ negative acknowledgment (NACK) corresponding to the earlier transmitted RRC message is received. Alternatively, or in addition thereto, the UE may retransmit at the RLC layer if a HARQ timeout occurs subsequent to transmitting the RRC message on the one or more granted UL SCH resources. In an aspect, such RRC messages may be SRB1/SRB2/SRB3 RRC messages. Note that FIG. 7 may also be applicable to block 450 and 950 (discussed further below).

Referring back to FIG. 6, in block 660, when it is determined that the one or more UL SCH resources are not unusable (N branch from block 630), i.e., when none of the granted UL SCH resources are usable to send the control message, the UE may send a scheduling request (SR) to the network node for UL SCH resources associated with HARQ processes of proper HARQ process types. That is, the SR may indicate one or more HARQ process type requirements of the control message.

Figure 8:
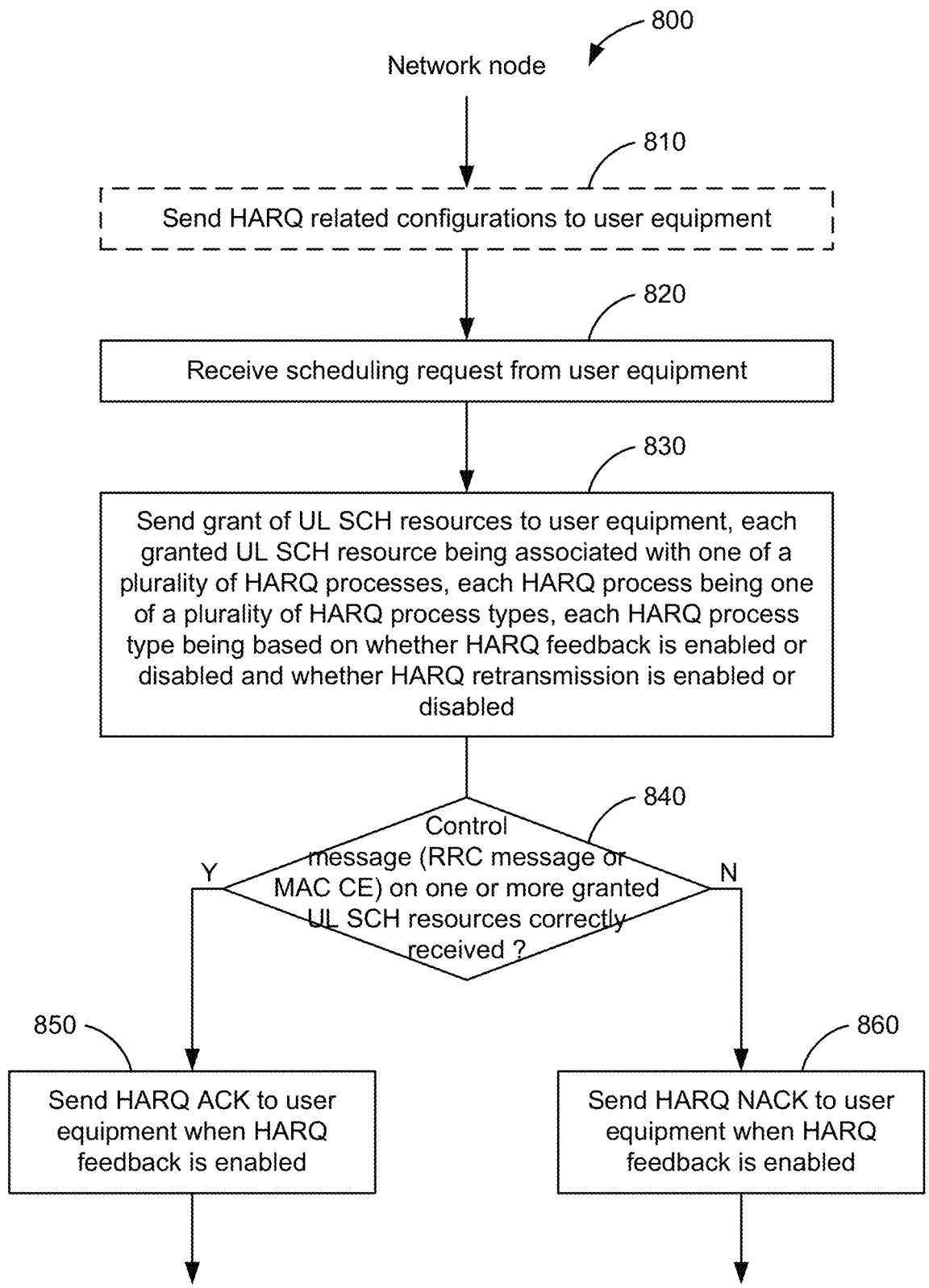
FIG. 8 illustrates a flow chart of an exemplary processes performed by a network node, according to various aspects.

FIG. 8 illustrates an exemplary method 800 performed by a network node such as a network node 210. In an aspect, the network node performing the method 800 may be a non-terrestrial network (NTN) node such as a satellite. Method 800 may be viewed as a network node counterpart to method 600.

At block 810, the network node may send HARQ related configurations to a UE (e.g., UE 130, 210). Details of the HARQ related configurations are discussed above with respect to block 610 of FIG. 6. Note that block 810 is dashed to indicate that it is optional.

In block 820, the network node may receive a scheduling request (SR) for UL SCH resources from the UE. In an aspect, the SR may indicate HARQ process requirements for the UL SCH resources.

In response, in block 830, the network node may send a grant of UL SCH resources to the UE. Alternatively or in addition thereto, the network node may send a grant of one or more DL SCH resources to the UE. Each granted SCH (UL or DL) resource may be associated with a HARQ process, which may be one of a number (e.g., 16) of HARQ processes supported by the UE and also supported by the network node. Each HARQ process may be one of a number (e.g., 4) of HARQ process types, in which each HARQ process type may be based on whether the HARQ feedback is enabled or disabled and whether the HARQ retransmission is enabled or disabled. For example, each HARQ process may be a first, second, third, or fourth HARQ process type as described above. The UL SCH resources may be granted in consideration of the HARQ process requirements included in the SR request. The details of the granted UL SCH resources are discussed above with respect to block 620 of FIG. 6.

In block 840, when the network node receives a control message (e.g., RRC message, MAC CE) on one or more granted UL SCH resources from the UE, the network node may determine whether or not the control message is correctly received.

In block 850, if the control message is correctly received (Y branch from block 840), the network node may send a positive HARQ acknowledgment (ACK) to the user equipment if the granted UL SCH resources carrying the control message are associated with a HARQ process that has HARQ feedback enabled. In other words, the ACK may be sent if the associated HARQ process is the first or the second HARQ process type.

On the other hand, in block 860, if the control message is not correctly received (N branch from block 840), the network node may send a HARQ negative acknowledgment (NACK) to the user equipment if the granted UL SCH resources carrying the message are associated with a HARQ process that has HARQ feedback enabled.

Figure 9:
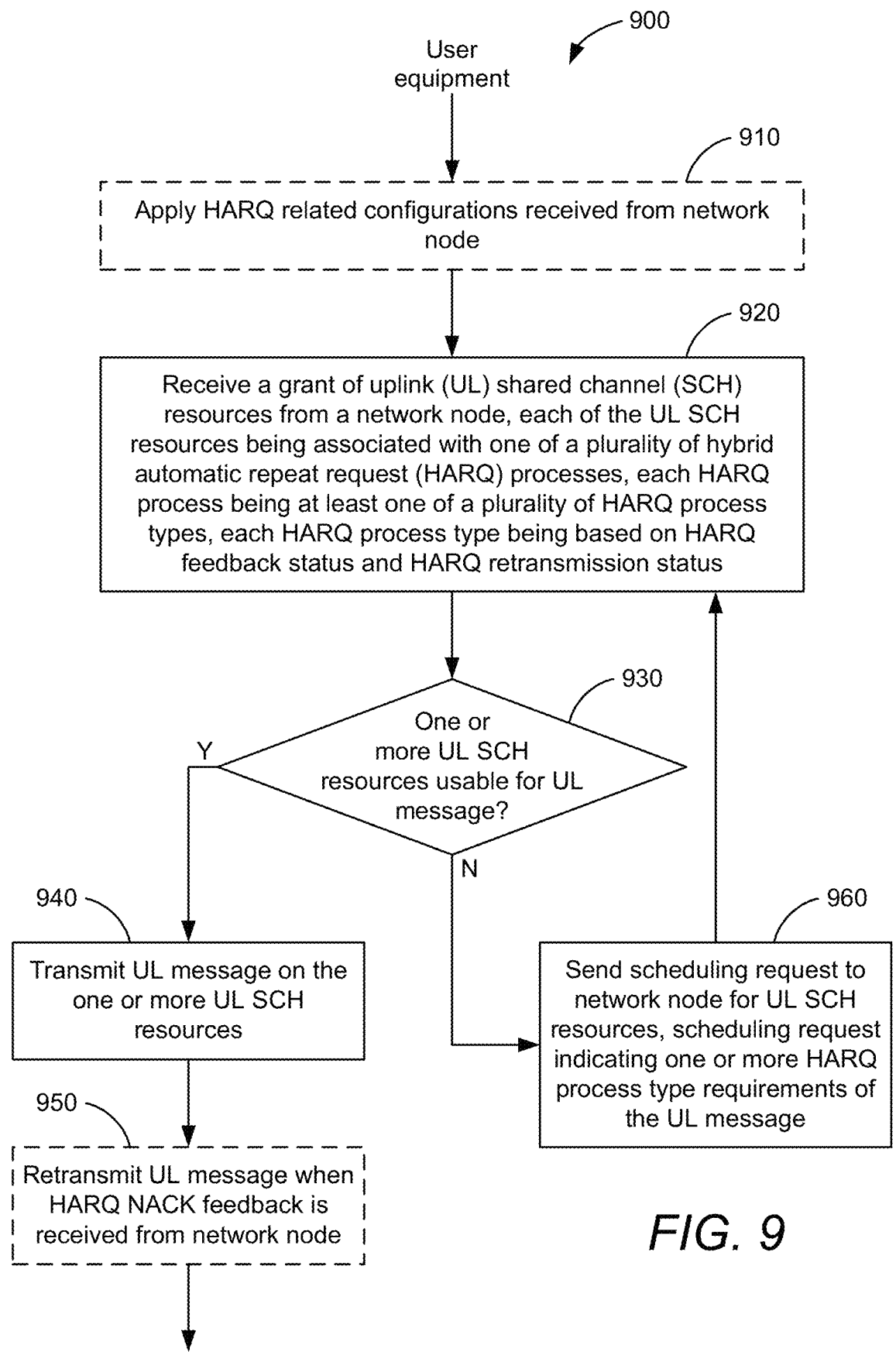
FIG. 9 illustrates a flow chart of an exemplary method performed by a user equipment, according to various aspects.

FIG. 9 illustrates yet another exemplary method 900 performed by a UE such as a UE 210. In an aspect, method 900 may be viewed as a version of the method 400 of FIG. 4. In method 900, it is assumed that the HARQ process types include at least the second HARQ process type, i.e., HARQ feedback enabled and HARQ retransmission disabled. Also, messages in general may be transmitted. Messages transmitted may include control messages and/or user data messages. For clarity, messages transmitted from the UE to the network node may be referred to as UL messages, and messages transmitted from the network node to the UE may be referred to as DL messages.

At block 910, the UE may apply HARQ related configurations received from a network node (e.g., satellite 110, coordinator 180, NTN 210). The HARQ related configurations may be received through DCI and/or RRC messages. Details of the HARQ related configurations are discussed above with respect to blocks 410 and 610 of FIGS. 4 and 6, respectively. Note that block 810 may be optional.

In block 920, the UE may receive a grant of one or more UL SCH resources from the network node. Each granted UL SCH resource may be associated with a HARQ process, which may be one of a number (e.g., 16) of HARQ processes supported by the UE. Each HARQ process may be one of a number (e.g., 4) of HARQ process types. The HARQ process types may be defined based on whether the HARQ feedback is enabled or disabled and whether the HARQ retransmission is enabled or disabled. At least one HARQ process type may be the second HARQ process type. Details of HARQ process types are discussed above with respect to block 620.

Blocks 930, 940, 950 and 960 are similar to blocks 630, 640, 650 and 660. Therefore, descriptions of 930, 940, 950 and 960 are not repeated for sake of conciseness. It should be noted however that blocks 930, 940, 950 and 960 apply to UL messages in general, which may include UL control and/or UL user data messages.

Figure 10:
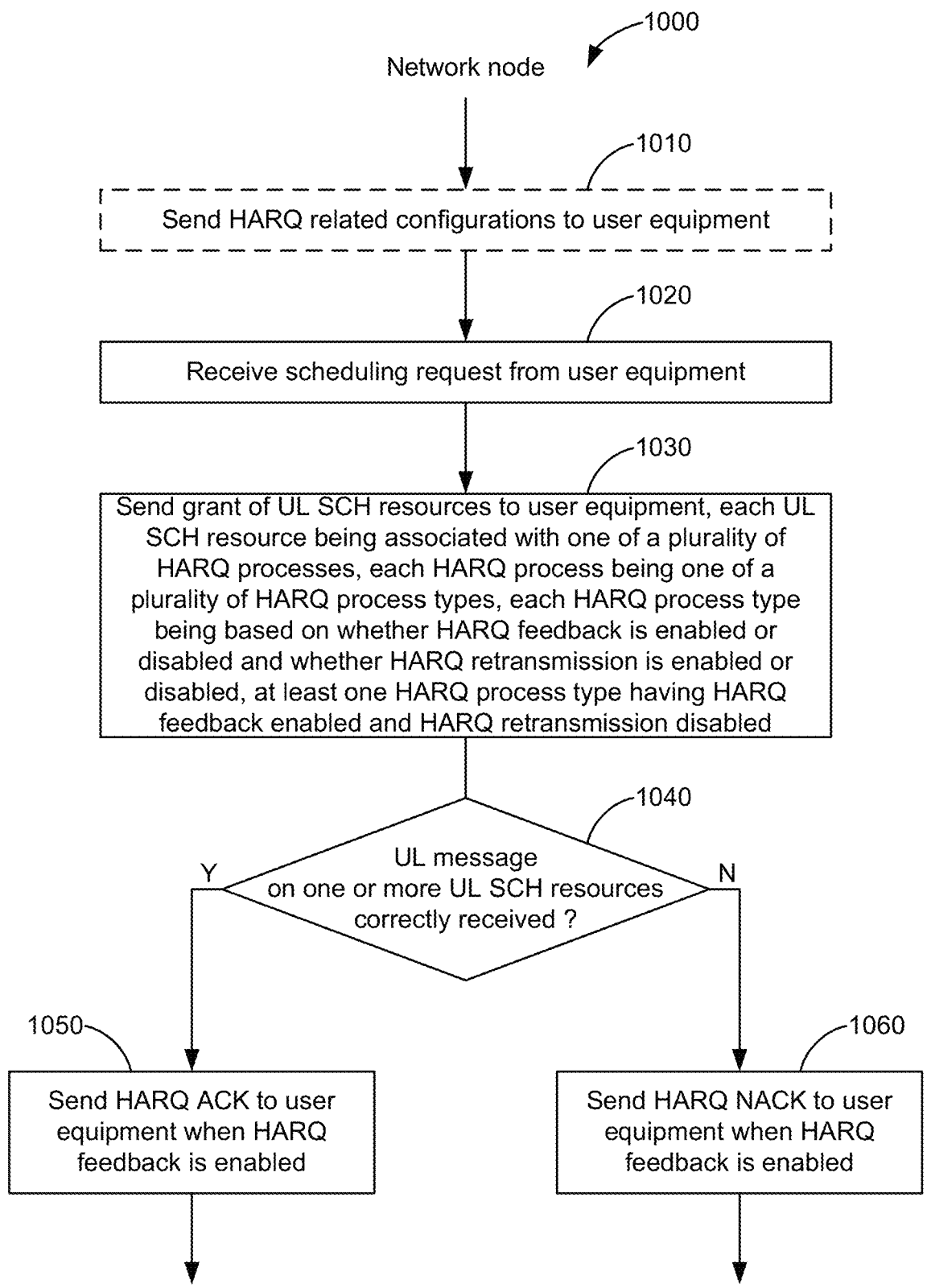
FIG. 10 illustrates a flow chart of an exemplary processes performed by a network node, according to various aspects.

FIG. 10 illustrates an exemplary method 1000 performed by a network node such as a network node 210. In an aspect, the network node performing the method 1000 may be a non-terrestrial network (NTN) node such as a satellite. Method 1000 may be viewed as a network node counterpart to method 900. In an aspect, it may be assumed that the HARQ process types include at least the second HARQ process type in method 1000. Also, UL messages in general (e.g., UL control messages and/or UL user data messages) may be received.

At block 1010, the network node may send HARQ related configurations to a UE (e.g., UE 130, 210). Details of the HARQ related configurations are discussed above with respect to block 610 and 810 of FIGS. 6 and 8. Again, block 1010 is may be optional.

In block 1020, the network node may receive a scheduling request (SR) for UL SCH resources from the UE. In an aspect, the SR may indicate HARQ process requirements for the UL SCH resources.

In response, in block 1030, the network node may send a grant of UL SCH resources to the UE. Each granted UL SCH resource may be associated with a HARQ process, which may be one of a number (e.g., 16) of HARQ processes supported by the UE and also supported by the network node. Each HARQ process may be one of a number (e.g., 4) of HARQ process types, in which each HARQ process type may be based on whether the HARQ feedback is enabled or disabled and whether the HARQ retransmission is enabled or disabled. At least one HARQ process type may be the second HARQ process type. Details of HARQ process types are discussed above with respect to blocks 620 and 820.

Blocks 1040, 1050 and 1060 are similar to blocks 840, 850 and 860. Therefore, descriptions of 1040, 1050 and 1060 are not repeated for sake of conciseness. But again, it should be noted that blocks 1040, 1050 and 1060 apply to UL messages in general.

Note that FIGS. 4-10 describe HARQ processes in the context of uplink communications, from the UE to network node. While not specifically illustrated, the HARQ processes may also apply to downlink communications, from the network node to the UE. In this context, the resources of the downlink (DL) shared channel (SCH) may be associated with the HARQ processes of different HARQ process types. In the DL SCH context, the roles of the flow charts of FIGS. 4-10 may be reversed with slight modifications.

Figure 11:
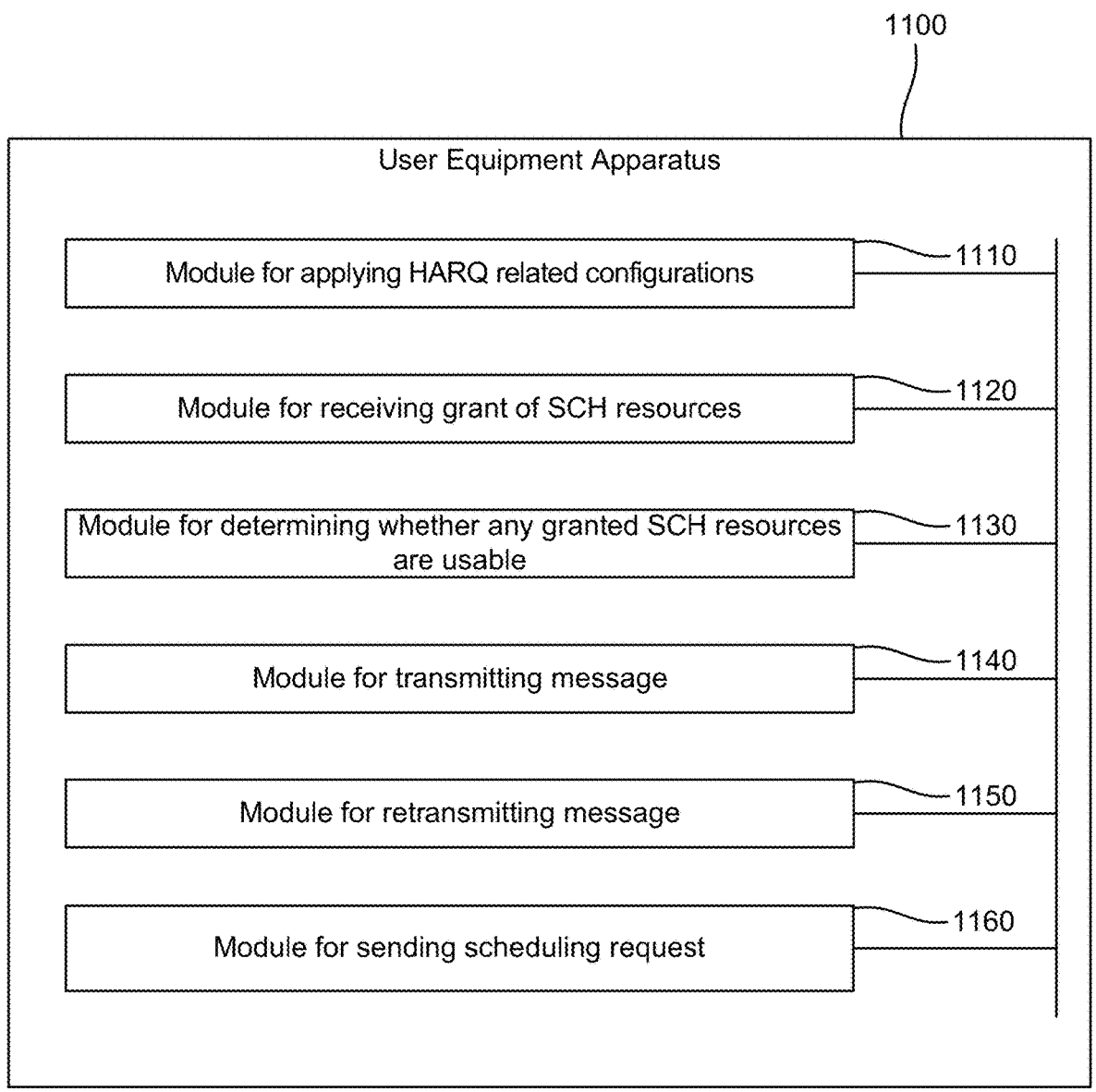
FIG. 11 illustrates a simplified block diagram of an example user equipment, according to various aspects.

FIG. 11 illustrates an example apparatus 1100 for implementing methods 400, 600 and 900 of FIGS. 4, 6, 7 and 9 represented as a series of interrelated functional modules in accordance with an aspect of the disclosure. In the illustrated example, the apparatus 1100 may include a module 1110 for applying HARQ related configurations received from a network node, a module 1120 for receiving a grant of SCH resources (UL and/or DL SCH resources) from the network node, a module 1130 for determining whether one or more of the granted SCH resources are usable to send a message, a module 1140 for transmitting the message on the one or more granted UL SCH resources when there are usable UL SCH resources, a module 1150 for retransmitting the message when NACK feedback is received from the network node, and a module 1160 for sending a scheduling request to the network node.

Figure 12:
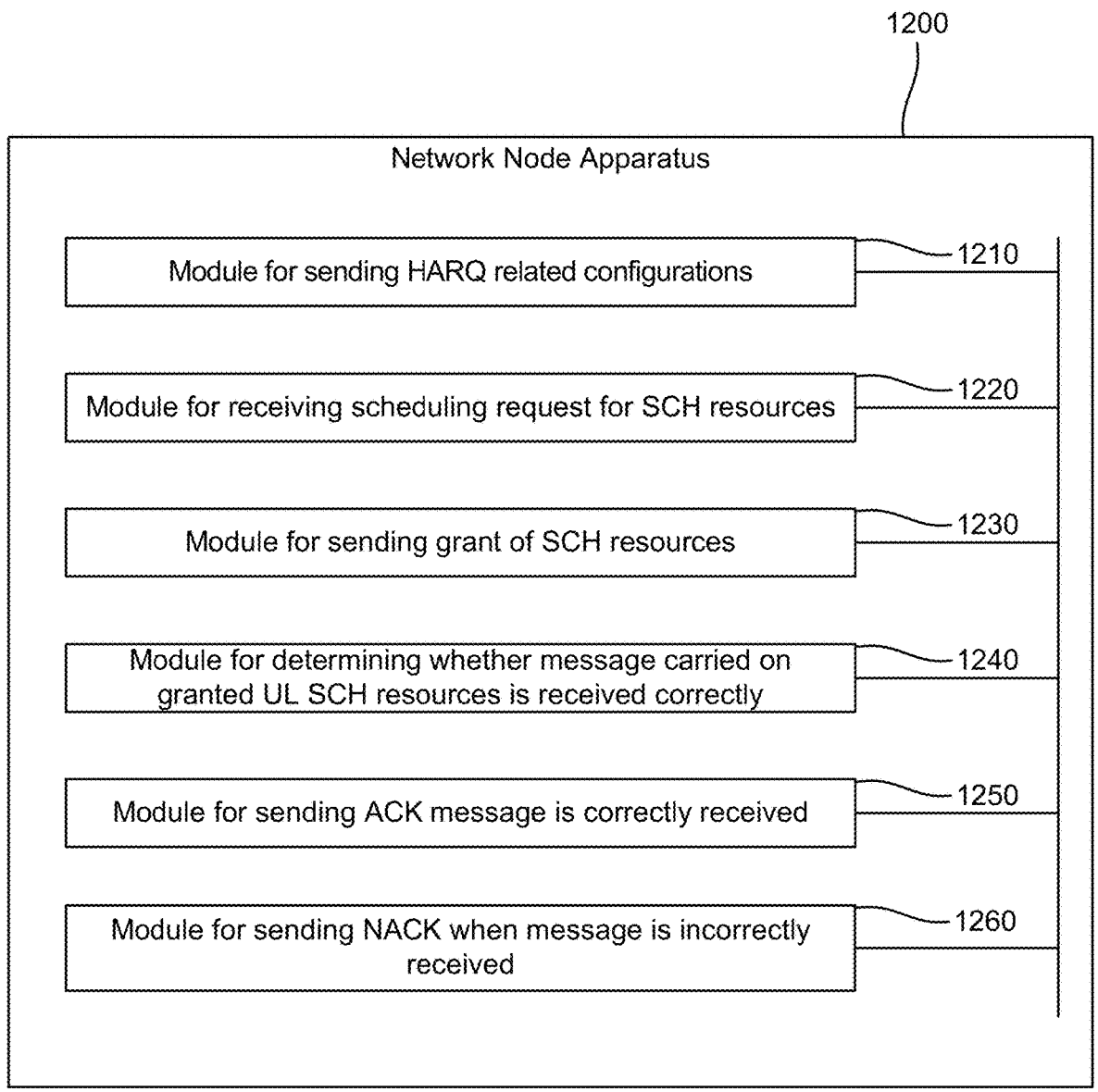
FIG. 12 illustrates a simplified block diagram of a network node, according to various aspects.

FIG. 12 illustrates an example apparatus 1200 for implementing methods 500, 800 and 1000 of FIGS. 5, 8 and 10 represented as a series of interrelated functional modules in accordance with an aspect of the disclosure. In the illustrated example, the apparatus 1200 may include a module 1210 for sending HARQ related configurations to a user equipment, a module 1220 for receiving a scheduling request for SCH resources (UL and/or DL SCH resources) from the user equipment, a module 1230 for sending a grant of the SCH resources to the user equipment, a module 1240 for determining whether the message carried on one or more UL SCH resources from the user equipment is received correctly, a module 1250 for sending a HARQ positive acknowledgment (ACK) to the UE when the message is correctly received and when a HARQ process associated with the one or more UL SCH resources has HARQ feedback enabled, and a module 1260 for sending a HARQ negative acknowledgment (NACK) to the UE when the message is incorrectly received and when the HARQ process associated with the one or more UL SCH resources has HARQ feedback enabled.

Implementation examples are described in the following numbered clauses:

Clause 1: A method of a user equipment (UE), comprising: receiving a grant of one or more uplink (UL) shared channel (SCH) resources from a network node, each of the one or more UL SCH resources being associated with one of a plurality of hybrid automatic repeat request (HARQ) processes, each HARQ process being one of a plurality of HARQ process types; determining whether one or more of the granted UL SCH resources are usable to send a message based on the HARQ process type of the HARQ process associated with each granted UL SCH resource, the message being a signaling message; and transmitting the message on the one or more of the granted UL SCH resources when the one or more of the granted UL SCH resources are determined to be usable.

Clause 2: The method of clause 1, wherein the network node is a non-terrestrial network (NTN) node.

Clause 3: The method of any of clauses 1-2, wherein the HARQ process type of each HARQ process is one of: a first HARQ process type wherein HARQ feedback and HARQ retransmission are both enabled, a second HARQ process type wherein HARQ feedback is enabled and HARQ retransmission is disabled, a third HARQ process type wherein HARQ feedback is disabled and HARQ retransmission is enabled, or a fourth HARQ process type wherein HARQ feedback and HARQ retransmission are both disabled.

Clause 4: The method of clause 3, wherein for each of the one or more UL SCH resources, the HARQ process type is determined based on any one or more of a radio network temporary identifier (RNTI) to be used, a HARQ process ID, or a rate matching/resource indicator.

Clause 5: The method of any of clauses 1-4, wherein the signaling message is a radio resource control (RRC) message.

Clause 6: The method of clause 5, wherein the RRC message is for transmission through any of the signaling radio bearers (SRBs), and wherein the one or more of the granted UL SCH resources are determined to be usable when each of the one or more of the granted UL SCH resources is associated with a HARQ process of the first HARQ process type.

Clause 7: The method of clause 5, wherein the RRC message is for transmission through any of signaling radio bearer 1 (SRB1), SRB2, and SRB3 or is in a dedicated control channel (DCCH), and wherein the one or more of the granted UL SCH resources are determined to be usable when each of the one or more of the granted UL SCH resources is associated with a HARQ process of the first HARQ process type.

Clause 8: The method of clause 7, wherein the one or more of the granted UL SCH resources are determined to be usable when the RRC message is for transmission other than through any of signaling radio bearer 1 (SRB1), SRB2, and SRB3 or is in a channel other than the (DCCH).

Clause 9: The method of clause 5, wherein the one or more of the granted UL SCH resources are determined to be usable when each of the one or more of the granted UL SCH resources is associated with a HARQ process of the second HARQ process type.

Clause 10: The method of clause 9, further comprising: retransmitting, at an RRC layer of the UE, the RRC message when a PHY layer of the UE informs the RRC layer that a HARQ negative acknowledgment (NACK) corresponding to the RRC message is received or a HARQ timeout occurs subsequent to transmitting the RRC message on the one or more usable UL SCH resources.

Clause 11: The method of any of clauses 1-4, wherein the signaling message is a medium access control (MAC) control element (CE) message.

Clause 12: The method of clause 11, wherein the one or more of the granted UL SCH resources are determined to be usable when each of the one or more of the granted UL SCH resources is associated with a HARQ process of the first HARQ process type.

Clause 13: The method of clause 12, wherein in transmitting the message, no UL data is transmitted on the one or more UL SCH resources.

Clause 14: The method of clause 11, wherein when UL data is to be transmitted along with the MAC CE message, whether the one or more UL SCH resources are usable is determined based on HARQ process type requirements of the UL data.

Clause 15: The method of any of clauses 11-14, wherein a scheduling request (SR) or an SR configuration is chosen at a MAC layer of the UE, the SR or the SR configuration indicating a HARQ process requirement for the MAC CE message.

Clause 16: The method of any of clauses 11-15, wherein when the MAC CE message has a higher priority than UL data, the one or more of the granted UL SCH resources are determined to be usable when each of the one or more of the granted UL SCH resources is associated with a HARQ process of any HARQ process type.

Clause 17: The method of any of clauses 11-15, wherein when the MAC CE message is a message in which a MAC CE retransmission timer is started after transmission thereof, the one or more of the granted UL SCH resources are determined to be usable when each of the one or more of the granted UL SCH resources is associated with a HARQ process of any HARQ process type.

Clause 18: The method of any of clauses 11-15, wherein the UE is configured with one or more HARQ-MAC CE matching rules, each HARQ-MAC CE rule mapping a MAC CE type with acceptable HARQ process types comprising any combination of the first, second, third, and fourth HARQ process types, and wherein the one or more of the granted UL SCH resources are determined to be usable when each of the one or more of the granted UL SCH resources is associated with a HARQ process of a HARQ process type included in the acceptable HARQ process types corresponding to the MAC CE type of the MAC CE message.

Clause 19: The method of clause 18, wherein the HARQ-MAC CE matching rules are statically and/or semi-statically configured in the UE.

Clause 20: The method of any of clauses 1-19, further comprising sending a scheduling request (SR) to the network node for UL SCH resources when it is determined that there are no usable UL SCH resources, the SR indicating one or more HARQ process type requirements.

Clause 21: A method of a network node, comprising: sending a grant of one or more uplink (UL) shared channel (SCH) resources to a user equipment (UE), each of the one or more UL SCH resources being associated with one of a plurality of hybrid automatic repeat request (HARQ) processes, each HARQ process being one of a plurality of HARQ process types; determining whether a message from the UE carried on one or more UL SCH resources is received correctly, the message being a signaling message; sending a HARQ positive acknowledgment (ACK) to the UE when the message is correctly received and when a HARQ process associated with the one or more UL SCH resources has HARQ feedback enabled; and sending a HARQ negative acknowledgment (NACK) to the UE when the message is incorrectly received and when the HARQ process associated with the one or more UL SCH resources has HARQ feedback enabled.

Clause 22: The method of clause 21, wherein the network node is a non-terrestrial network (NTN) node.

Clause 23: The method of any of clauses 21-22, wherein the HARQ process type of each HARQ process is one of: a first HARQ process type wherein HARQ feedback and HARQ retransmission are both enabled, a second HARQ process type wherein HARQ feedback is enabled and HARQ retransmission is disabled, a third HARQ process type wherein HARQ feedback is disabled and HARQ retransmission is enabled, or a fourth HARQ process type wherein HARQ feedback and HARQ retransmission are both disabled.

Clause 24: The method of any of clauses 21-23, further comprising: receiving a scheduling request (SR) for the UL SCH resources from the UE, wherein the SR indicates one or more HARQ process type requirements, and the granted UL SCH resources include one or more UL SCH resources associated with the HARQ processes of the requested HARQ process type requirements.

Clause 25: The method of any of clauses 21-24, wherein for each of the one or more UL SCH resources, the HARQ process type is determined based on any one or more of a radio network temporary identifier (RNTI) to be used, a HARQ process ID, or a rate matching/resource indicator.

Clause 26: The method of any of clauses 21-25, wherein the signaling message is a radio resource control (RRC) message.

Clause 27: The method of any of clauses 21-25, wherein the signaling message is a medium access control (MAC) control element (CE) message.

Clause 28: A user equipment comprising at least one means for performing a method of any of clauses 1-20.

Clause 29: A network node comprising at least one means for performing a method of any of clauses 21-27.

Clause 30: A user equipment comprising a processor, memory coupled with the processor, the processor and memory configured perform a method of any of clauses 1-20.

Clause 31: A network node comprising a processor, memory coupled with the processor, the processor and memory configured perform a method of any of clauses 21-27.

Clause 32: A non-transitory computer-readable medium storing code for a user equipment comprising a processor, memory coupled with the processor, and instructions stored in the memory and executable by the processor to cause the user equipment to perform a method of any of clauses 1-20.

Clause 33: A non-transitory computer-readable medium storing code for a network node comprising a processor, memory coupled with the processor, and instructions stored in the memory and executable by the processor to cause the network node to perform a method of any of clauses 21-27.

Clause 34: A method of a network node, comprising: sending a grant of one or more downlink (DL) shared channel (SCH) resources to a user equipment (UE), each of the one or more DL SCH resources being associated with one of a plurality of hybrid automatic repeat request (HARQ) processes, each HARQ process being one of a plurality of HARQ process types; determining whether one or more of the granted DL SCH resources are usable to send a message based on the HARQ process type of the HARQ process associated with each granted DL SCH resource, the message being a signaling message; and transmitting the message on the one or more of the granted DL SCH resources when the one or more of the granted DL SCH resources are determined to be usable.

Clause 35: The method of clause 34, wherein the network node is a non-terrestrial network (NTN) node.

Clause 36: The method of any of clauses 34-35, wherein the HARQ process type of each HARQ process is one of: a first HARQ process type wherein HARQ feedback and HARQ retransmission are both enabled, a second HARQ process type wherein HARQ feedback is enabled and HARQ retransmission is disabled, a third HARQ process type wherein HARQ feedback is disabled and HARQ retransmission is enabled, or a fourth HARQ process type wherein HARQ feedback and HARQ retransmission are both disabled.

Clause 37: The method of clause 36, wherein for each of the one or more granted DL SCH resources, the HARQ process type is determined based on any one or more of a radio network temporary identifier (RNTI) to be used, a HARQ process ID, or a rate matching/resource indicator.

Clause 38: The method of any of clauses 34-37, wherein the signaling message is a radio resource control (RRC) message.

Clause 39: The method of clause 38, wherein the RRC message is for transmission through any of the signaling radio bearers (SRBs), and wherein the one or more of the granted DL SCH resources are determined to be usable when each of the one or more of the granted DL SCH resources is associated with a HARQ process of the first HARQ process type.

Clause 40: The method of clause 38, wherein the RRC message is for transmission through any of signaling radio bearer 1 (SRB1), SRB2, and SRB3 or is in a dedicated control channel (DCCH), and wherein the one or more of the granted DL SCH resources are determined to be usable when each of the one or more of the granted DL SCH resources is associated with a HARQ process of the first HARQ process type.

Clause 41: The method of clause 40, wherein the one or more of the granted DL SCH resources are determined to be usable when the RRC message is for transmission other than through any of signaling radio bearer 1 (SRB1), SRB2, and SRB3 or is in a channel other than the (DCCH).

Clause 42: The method of clause 38, wherein the one or more of the granted UL SCH resources are determined to be usable when each of the one or more of the granted UL SCH resources is associated with a HARQ process of the second HARQ process type.

Clause 43: The method of clause 42, further comprising: retransmitting, at an RRC layer of the network node, the RRC message when a PHY layer of the network node informs the RRC layer that a HARQ negative acknowledgment (NACK) corresponding to the RRC message is received or a HARQ timeout occurs subsequent to transmitting the RRC message on the one or more usable DL SCH resources.

Clause 44: The method of any of clauses 34-37, wherein the signaling message is a medium access control (MAC) control element (CE) message.

Clause 45: The method of clause 44, wherein the one or more of the granted DL SCH resources are determined to be usable when each of the one or more of the granted DL SCH resources is associated with a HARQ process of the first HARQ process type.

Clause 46: The method of clause 45, wherein in transmitting the message, no UL data is transmitted on the one or more DL SCH resources.

Clause 47: The method of clause 44, wherein when DL data is to be transmitted along with the MAC CE message, whether the one or more DL SCH resources are usable is determined based on HARQ process type requirements of the DL data.

Clause 48: The method of any of clauses 44-47, wherein when the MAC CE message has a higher priority than DL data, the one or more of the granted DL SCH resources are determined to be usable when each of the one or more of the granted DL SCH resources is associated with a HARQ process of any HARQ process type.

Clause 49: The method of any of clauses 44-47, wherein when the MAC CE message is a message in which a MAC CE retransmission timer is started after transmission thereof, the one or more of the granted DL SCH resources are determined to be usable when each of the one or more of the granted DL SCH resources is associated with a HARQ process of any HARQ process type.

Clause 50: The method of any of clauses 44-47, wherein the network node is configured with one or more HARQ-MAC CE matching rules, each HARQ-MAC CE rule mapping a MAC CE type with acceptable HARQ process types comprising any combination of the first, second, third, and fourth HARQ process types, and wherein the one or more of the granted DL SCH resources are determined to be usable when each of the one or more of the granted DL SCH resources is associated with a HARQ process of a HARQ process type included in the acceptable HARQ process types corresponding to the MAC CE type of the MAC CE message.

Clause 51: The method of clause 50, wherein the HARQ-MAC CE matching rules are statically and/or semi-statically configured in the network node.

Clause 52: A method of a user equipment (UE), comprising: receiving a grant of one or more downlink (DL) shared channel (SCH) resources to from a network node, each of the one or more DL SCH resources being associated with one of a plurality of hybrid automatic repeat request (HARQ) processes, each HARQ process being one of a plurality of HARQ process types; determining whether a message from the network node carried on one or more DL SCH resources is received correctly, the message being a signaling message; sending a HARQ positive acknowledgment (ACK) to the network node when the message is correctly received and when a HARQ process associated with the one or more DL SCH resources has HARQ feedback enabled; and sending a HARQ negative acknowledgment (NACK) to the network node when the message is incorrectly received and when the HARQ process associated with the one or more DL SCH resources has HARQ feedback enabled.

Clause 53: The method of clause 52, wherein the network node is a non-terrestrial network (NTN) node.

Clause 54: The method of any of clauses 52-53, wherein the HARQ process type of each HARQ process is one of: a first HARQ process type wherein HARQ feedback and HARQ retransmission are both enabled, a second HARQ process type wherein HARQ feedback is enabled and HARQ retransmission is disabled, a third HARQ process type wherein HARQ feedback is disabled and HARQ retransmission is enabled, or a fourth HARQ process type wherein HARQ feedback and HARQ retransmission are both disabled.

Clause 55: The method of any of clauses 52-54, wherein for each of the one or more DL SCH resources, the HARQ process type is determined based on any one or more of a radio network temporary identifier (RNTI) to be used, a HARQ process ID, or a rate matching/resource indicator.

Clause 56: The method of any of clauses 52-55, wherein the signaling message is a radio resource control (RRC) message.

Clause 57: The method of any of clauses 52-55, wherein the signaling message is a medium access control (MAC) control element (CE) message.

Clause 58: A network node comprising at least one means for performing a method of any of clauses 34-51.

Clause 59: A user equipment comprising at least one means for performing a method of any of clauses 52-57.

Clause 60: A network node comprising a processor, memory coupled with the processor, the processor and memory configured perform a method of any of clauses 34-51.

Clause 61: A user equipment comprising a processor, memory coupled with the processor, the processor and memory configured perform a method of any of clauses 52-57.

Clause 62: A non-transitory computer-readable medium storing code for a network node comprising a processor, memory coupled with the processor, and instructions stored in the memory and executable by the processor to cause the network node to perform a method of any of clauses 34-51.

Clause 63: A non-transitory computer-readable medium storing code for a user equipment comprising a processor, memory coupled with the processor, and instructions stored in the memory and executable by the processor to cause the user equipment to perform a method of any of clauses 52-57.

Clause 64: A method of a user equipment (UE), comprising: receiving a grant of uplink (UL) shared channel (SCH) resources from a network node, each of the granted UL SCH resources being associated with one of a plurality of hybrid automatic repeat request (HARQ) processes, each HARQ process being one of a plurality of HARQ process types, each HARQ process type being based on whether HARQ feedback is enabled or disabled and whether HARQ retransmission is enabled or disabled; and transmitting a control message on one or more of the granted UL SCH resources in response to the one or more granted UL SCH resources being determined to be usable based on the HARQ process type of the HARQ processes associated with the one or more of the granted UL SCH resources, the control message being a radio resource control (RRC) message or a medium access control (MAC) control element (CE).

Clause 65: The method of clause 64, wherein the plurality of HARQ process types include first, second, third, and fourth HARQ process types, the first HARQ process type having the HARQ feedback enabled and the HARQ retransmission enabled, the second HARQ process type having the HARQ feedback enabled and the HARQ retransmission disabled, the third HARQ process type having the HARQ feedback disabled and the HARQ retransmission enabled, and the fourth HARQ process type having the HARQ feedback disabled and the HARQ retransmission disabled.

Clause 66: The method of clause 65, wherein the control message is the RRC message, and wherein the one or more of the granted UL SCH resources are determined to be usable when the one or more of the granted UL SCH resources are associated with HARQ processes of the first HARQ process type.

Clause 67: The method of clause 65, wherein the control message is the RRC message for transmission through any of signaling radio bearer 1 (SRB1), SRB2, and SRB3 or is in a dedicated control channel (DCCH), and wherein the one or more of the granted UL SCH resources are determined to be usable when the one or more of the granted UL SCH resources are associated with HARQ processes of the first HARQ process type.

Clause 68: The method of clause 67, wherein the RRC message is for transmission other than through any of the SRB1, SRB2, and SRB3 or is in a channel other than the (DCCH), and wherein the one or more of the granted UL SCH resources are determined to be usable when the one or more of the granted UL SCH resources are associated with HARQ processes of any of the first, second, third, or fourth HARQ process types.

Clause 69: The method of clause 65, wherein the control message is the RRC message, and wherein the one or more of the granted UL SCH resources are determined to be usable when the one or more of the granted UL SCH resources are associated with HARQ processes of the second HARQ process type.

Clause 70: The method of clause 69, retransmitting, at an RRC layer of the UE, the RRC message when a PHY layer of the UE informs the RRC layer that a HARQ negative acknowledgment (NACK) corresponding to the RRC message is received or a HARQ timeout occurs subsequent to transmitting the RRC message on the one or more granted UL SCH resources; and retransmitting, at radio link control (RLC) layer of the UE, the RRC message when the PHY layer of the UE informs the RLC layer that the NACK corresponding to the RRC message is received or the HARQ timeout occurs subsequent to transmitting the RRC message on the one or more granted UL SCH resources.

Clause 71: The method of clause 70, wherein the RRC layer retransmits the RRC message when the RRC message is for transmission through a signaling radio bearer 0 (SRB0), and wherein the RLC layer retransmits the RRC message when the RRC message is for transmission through an SRB1, an SRB2, or an SRB3.

Clause 72: The method of any of clauses 64-71, wherein the control message is the MAC CE, and wherein the one or more of the granted UL SCH resources are determined to be usable when the one or more of the granted UL SCH resources are associated with HARQ processes of the first HARQ process type.

Clause 73: The method of any of clauses 64-71, wherein the control message is the MAC CE and UL data is to be transmitted along with the MAC CE, and wherein the one or more of the granted UL SCH resources are determined to be usable based on HARQ process type requirements of the UL data.

Clause 74: The method of any of clauses 64-71, wherein the control message is the MAC CE that has higher priority than UL data, and wherein the one or more of the granted UL SCH resources are determined to be usable when the one or more of the granted UL SCH resources are associated with HARQ processes of the first, second, or third HARQ process type.

Clause 75: The method of any of clauses 64-71, wherein the control message is the MAC CE in which a MAC CE retransmission timer is started after the transmission thereof, and wherein the one or more of the granted UL SCH resources are determined to be usable when the one or more of the granted UL SCH resources are associated with HARQ processes of any of the first, second, third, or fourth HARQ process types.

Clause 76: The method of any of clauses 64-71, wherein the control message is the MAC CE, wherein the UE is configured with one or more HARQ-MAC CE matching rules, each HARQ-MAC CE rule mapping a MAC CE type with acceptable HARQ process types comprising any combination of the first, second, third, and fourth HARQ process types, each HARQ-MAC CE matching rule being statically or semi-statically configured in the UE, and wherein the one or more of the granted UL SCH resources are determined to be usable when the one or more of the granted UL SCH resources are associated with HARQ processes of HARQ process types included in the acceptable HARQ process types corresponding to the MAC CE type of the MAC CE.

Clause 77: The method of any of clauses 64-76, sending a scheduling request (SR) to the network node for UL SCH resources when the one or more UL SCH resources are not determined to be usable, the SR indicating one or more HARQ process type requirements of the control message.

Clause 78: A user equipment comprising at least one means for performing a method of any of clauses 64-77.

Clause 79: A user equipment comprising a processor, memory coupled with the processor, the processor and memory configured perform a method of any of clauses 64-77.

Clause 80: A non-transitory computer-readable medium storing code for a user equipment comprising a processor, memory coupled with the processor, and instructions stored in the memory and executable by the processor to cause the user equipment to perform a method of any of clauses 64-77.

Clause 81: A method of a user equipment (UE), comprising: receiving a grant of uplink (UL) shared channel (SCH) resources from a network node, each of the granted UL SCH resources being associated with one of a plurality of hybrid automatic repeat request (HARQ) processes, each HARQ process being one of a plurality of HARQ process types, each HARQ process type being based on whether HARQ feedback is enabled or disabled and whether HARQ retransmission is enabled or disabled, at least one HARQ process type having the HARQ feedback enabled and the HARQ retransmission disabled; and transmitting a control message on one or more of the granted UL SCH resources in response to the one or more granted UL SCH resources being determined to be usable based on the HARQ process type of the HARQ processes associated with the one or more of the granted UL SCH resources.

Clause 82: The method of clause 81, wherein the plurality of HARQ process types include first, second, third, and fourth HARQ process types, the first HARQ process type having the HARQ feedback enabled and the HARQ retransmission enabled, the second HARQ process type being the at least one HARQ process type, the third HARQ process type having the HARQ feedback disabled and the HARQ retransmission enabled, and the fourth HARQ process type having the HARQ feedback disabled and the HARQ retransmission disabled.

Clause 83: The method of clause 82, wherein the control message is a radio resource control (RRC) message, and wherein the one or more of the granted UL SCH resources are determined to be usable when the one or more of the granted UL SCH resources are associated with HARQ processes of the first HARQ process type.

Clause 84: The method of clause 82, wherein the control message is a radio resource control (RRC) message for transmission through any of signaling radio bearer 1 (SRB1), SRB2, and SRB3 or is in a dedicated control channel (DCCH), and wherein the one or more of the granted UL SCH resources are determined to be usable when the one or more of the granted UL SCH resources are associated with HARQ processes of the first HARQ process type.

Clause 85: The method of clause 84, wherein the RRC message is for transmission other than through any of the SRB1, SRB2, and SRB3 or is in a channel other than the (DCCH), and wherein the one or more of the granted UL SCH resources are determined to be usable when the one or more of the granted UL SCH resources are associated with HARQ processes of any of the first, second, third, or fourth HARQ process types.

Clause 86: The method of clause 82, wherein the control message is a radio resource control (RRC) message, and wherein the one or more of the granted UL SCH resources are determined to be usable when the one or more of the granted UL SCH resources are associated with HARQ processes of the second HARQ process type.

Clause 87: The method of clause 86, retransmitting, at an RRC layer of the UE, the RRC message when a PHY layer of the UE informs the RRC layer that a HARQ negative acknowledgment (NACK) corresponding to the RRC message is received or a HARQ timeout occurs subsequent to transmitting the RRC message on the one or more granted UL SCH resources; and retransmitting, at radio link control (RLC) layer of the UE, the RRC message when the PHY layer of the UE informs the RLC layer that the NACK corresponding to the RRC message is received or the HARQ timeout occurs subsequent to transmitting the RRC message on the one or more granted UL SCH resources.

Clause 88: The method of clause 87, wherein the RRC layer retransmits the RRC message when the RRC message is for transmission through a signaling radio bearer 0 (SRB0), and wherein the RLC layer retransmits the RRC message when the RRC message is for transmission through an SRB1, an SRB2, or an SRB3.

Clause 89: The method of any of clauses 81-87, wherein the control message is a medium access control (MAC) control element (CE), and wherein the one or more of the granted UL SCH resources are determined to be usable when the one or more of the granted UL SCH resources are associated with HARQ processes of the first HARQ process type.

Clause 90: The method of any of clauses 81-87, wherein the control message is a medium access control (MAC) control element (CE) and UL data is to be transmitted along with the MAC CE, and wherein the one or more of the granted UL SCH resources are determined to be usable based on HARQ process type requirements of the UL data.

Clause 91: The method of any of clauses 81-87, wherein the control message is a medium access control (MAC) control element (CE) that has higher priority than UL data, and wherein the one or more of the granted UL SCH resources are determined to be usable when the one or more of the granted UL SCH resources are associated with HARQ processes of the first, second, or third HARQ process type.

Clause 92: The method of any of clauses 81-87, wherein the control message a medium access control (MAC) control element (CE) in which a MAC CE retransmission timer is started after the transmission thereof, and wherein the one or more of the granted UL SCH resources are determined to be usable when the one or more of the granted UL SCH resources are associated with HARQ processes of any of the first, second, third, or fourth HARQ process types.

Clause 93: The method of any of clauses 81-87, wherein the control message a medium access control (MAC) control element (CE), wherein the UE is configured with one or more HARQ-MAC CE matching rules, each HARQ-MAC CE rule mapping a MAC CE type with acceptable HARQ process types comprising any combination of the first, second, third, and fourth HARQ process types, each HARQ-MAC CE matching rule being statically or semi-statically configured in the UE, and wherein the one or more of the granted UL SCH resources are determined to be usable when the one or more of the granted UL SCH resources are associated with HARQ processes of HARQ process types included in the acceptable HARQ process types corresponding to the MAC CE type of the MAC CE.

Clause 94: The method of any of clauses 81-93, sending a scheduling request (SR) to the network node for UL SCH resources when the one or more UL SCH resources are not determined to be usable, the SR indicating one or more HARQ process type requirements of the control message.

Clause 95: A user equipment comprising at least one means for performing a method of any of clauses 81-94.

Clause 96: A user equipment comprising a processor, memory coupled with the processor, the processor and memory configured perform a method of any of clauses 81-94.

Clause 97: A non-transitory computer-readable medium storing code for a user equipment comprising a processor, memory coupled with the processor, and instructions stored in the memory and executable by the processor to cause the user equipment to perform a method of any of clauses 81-94.

Clause 98: A method of a user equipment (UE), comprising: receiving a grant of uplink (UL) shared channel (SCH) resources from a network node, each of the UL SCH resources being associated with one of a plurality of hybrid automatic repeat request (HARQ) processes, each HARQ process being at least one of a plurality of HARQ process types, each HARQ process type being based on HARQ feedback status and HARQ retransmission status; and transmitting a control message on one or more of the UL SCH resources in response to the one or more UL SCH resources being determined to be usable based on the HARQ process type of the HARQ processes associated with the one or more of the UL SCH resources, the control message being a radio resource control (RRC) message or a medium access control (MAC) control element (CE).

Clause 99: The method of clause 94, wherein the plurality of HARQ process types includes first, second, third, and fourth HARQ process types, the first HARQ process type having the HARQ feedback status enabled and the HARQ retransmission status enabled, the second HARQ process type having the HARQ feedback status enabled and the HARQ retransmission status disabled, the third HARQ process type having the HARQ feedback status disabled and the HARQ retransmission status enabled, and the fourth HARQ process type having the HARQ feedback status disabled and the HARQ retransmission status disabled.

Clause 100: The method of clause 99, wherein the control message is the RRC message, and wherein the one or more of the UL SCH resources are determined to be usable in response to the one or more of the UL SCH resources being associated with HARQ processes of the first HARQ process type.

Clause 101: The method of clause 99, wherein the control message is the RRC message for transmission through signaling radio bearer 1 (SRB1), SRB2, or SRB3 or is in a dedicated control channel (DCCH), and wherein the one or more of the UL SCH resources are determined to be usable in response to the one or more of the UL SCH resources being associated with HARQ processes of the first HARQ process type.

Clause 102: The method of clause 99, wherein the control message is the RRC message for transmission other than through SRB1, SRB2, or SRB3 or is in a channel other than a dedicated control channel (DCCH), and wherein the one or more of the UL SCH resources are determined to be usable in response to the one or more of the UL SCH resources being associated with HARQ processes of the first, second, third, or fourth HARQ process types.

Clause 103: The method of clause 102, wherein the method further comprises: retransmitting, at an RRC layer of the UE, the RRC message in response to a physical (PHY) layer of the UE informing the RRC layer that a HARQ negative acknowledgment (NACK) corresponding to the RRC message is received or a HARQ timeout occurs subsequent to transmitting the RRC message on the one or more UL SCH resources; or retransmitting, at radio link control (RLC) layer of the UE, the RRC message in response to the PHY layer of the UE informing the RLC layer that the NACK corresponding to the RRC message is received or the HARQ timeout occurs subsequent to transmitting the RRC message on the one or more UL SCH resources.

Clause 104: The method of clause 99, wherein the control message is the MAC CE, and wherein the one or more of the UL SCH resources are determined to be usable in response to the one or more of the UL SCH resources being associated with HARQ processes of the first HARQ process type.

Clause 105: The method of clause 99, wherein the control message is the MAC CE and is determined that UL data is to be transmitted along with the MAC CE, and wherein one or more of the UL SCH resources are determined to be usable based on HARQ process type requirements of the UL data.

Clause 106: The method of clause 99, wherein the control message is the MAC CE and a priority of the MAC CE is higher than a priority of UL data, and wherein one or more of the UL SCH resources are determined to be usable in response to the one or more of the UL SCH resources being associated with HARQ processes of the first, second, or third HARQ process type.

Clause 107: The method of clause 99, wherein the control message is the MAC CE and a MAC CE retransmission timer or a MAC CE prohibit timer is started after the transmission of the MAC CE, and wherein one or more of the UL SCH resources are determined to be usable in response to the one or more of the UL SCH resources being associated with HARQ processes of the first, second, third, or fourth HARQ process types.

Clause 108: The method of clause 99, wherein the control message is the MAC CE, wherein the UE is configured with one or more HARQ-MAC CE matching rules, each HARQ-MAC CE matching rule mapping a MAC CE type with acceptable HARQ process types comprising one or more of the first, second, third, and fourth HARQ process types, each HARQ-MAC CE matching rule being statically or semi-statically configured in the UE, and wherein the one or more of the UL SCH resources are determined to be usable in response to the one or more of the UL SCH resources being associated with HARQ processes of HARQ process types included in the acceptable HARQ process types corresponding to the MAC CE type of the MAC CE.

Clause 109: The method of any of clauses 99-108, further comprising: sending a scheduling request (SR) to the network node for UL SCH resources in response to the one or more UL SCH resources not being determined to be usable, the SR indicating one or more HARQ process type requirements of the control message.

Clause 110: The method of any of clauses 99-109, further comprising: receiving a message on one or more downlink (DL) SCH resources from the network node, the message being a radio resource control (RRC) message or a medium access control (MAC) control element (CE), wherein the one or more of the DL SCH resources are determined to be associated with HARQ processes having the HARQ feedback status enabled and the HARQ retransmission status enabled.

Clause 111: A user equipment comprising at least one means for performing a method of any of clauses 98-110.

Clause 112: A user equipment comprising a processor, memory coupled with the processor, the processor and memory configured perform a method of any of clauses 98-110.

Clause 113: A non-transitory computer-readable medium storing code for a user equipment comprising a processor, memory coupled with the processor, and instructions stored in the memory and executable by the processor to cause the user equipment to perform a method of any of clauses 98-110.

Clause 114: A method of a network node, comprising: transmitting a control message on one or more downlink (DL) shared channel (SCH) resources in response to the one or more DL SCH resources being determined to be usable for the control message based on a HARQ process type of the HARQ processes associated with the one or more of the DL SCH resources, each HARQ process being at least one of a plurality of HARQ process types, each HARQ process type being based on HARQ feedback status and HARQ retransmission status, the control message being a radio resource control (RRC) message or a medium access control (MAC) control element (CE).

Clause 115: The method of clause 114, wherein the plurality of HARQ process types includes first, second, third, and fourth HARQ process types, the first HARQ process type having the HARQ feedback status enabled and the HARQ retransmission status enabled, the second HARQ process type having the HARQ feedback status enabled and the HARQ retransmission status disabled, the third HARQ process type having the HARQ feedback status disabled and the HARQ retransmission status enabled, and the fourth HARQ process type having the HARQ feedback status disabled and the HARQ retransmission status disabled.

Clause 116: The method of clause 115, wherein the one or more of the DL SCH resources are determined to be usable in response to the one or more of the DL SCH resources being associated with one or more HARQ processes of the first HARQ process type or the second HARQ process type.

Clause 117: The method of clause 115, wherein the control message is the MAC CE, and wherein the one or more of the DL SCH resources are determined to be usable in response to the one or more of the DL SCH resources being associated with one or more HARQ processes of the first, second, third, or fourth HARQ process types.

Clause 118: A network node comprising at least one means for performing a method of any of clauses 114-117.

Clause 119: A network node comprising a processor, memory coupled with the processor, the processor and memory configured perform a method of any of clauses 114-117.

Clause 120: A non-transitory computer-readable medium storing code for a network node comprising a processor, memory coupled with the processor, and instructions stored in the memory and executable by the processor to cause the user equipment to perform a method of any of clauses 114-117.

Clause 121: A method of a user equipment (UE), comprising: receiving a grant of shared channel (SCH) resources from a network node, the SCH resources comprising uplink (UL) SCH resources or downlink (DL) SCH resources or both, each of the SCH resources being associated with one of a plurality of hybrid automatic repeat request (HARQ) processes, each HARQ process being at least one of a plurality of HARQ process types, each HARQ process type being based on HARQ feedback status and HARQ retransmission status; and transmitting an UL message on one or more of the UL SCH resources in response to the one or more UL SCH resources being determined to be usable based on the HARQ process type of the HARQ processes associated with the one or more of the UL SCH resources, and wherein a HARQ process type of at least one HARQ process has the HARQ feedback status enabled and the HARQ retransmission disabled.

Clause 122: The method of clause 121, wherein the plurality of HARQ process types includes first, second, third, and fourth HARQ process types, the first HARQ process type having the HARQ feedback status enabled and the HARQ retransmission status enabled, the second HARQ process type having the HARQ feedback status enabled and the HARQ retransmission status disabled, the third HARQ process type having the HARQ feedback status disabled and the HARQ retransmission status enabled, and the fourth HARQ process type having the HARQ feedback status disabled and the HARQ retransmission status disabled, and wherein a HARQ process type of at least one HARQ process is the second HARQ process type.

Clause 123: The method of clause 122, wherein the UL message is a radio resource control (RRC) message, and wherein the one or more of the UL SCH resources are determined to be usable in response to the one or more of the UL SCH resources being associated with HARQ processes of the first HARQ process type or the second HARQ process type.

Clause 124: The method of clause 122, wherein the UL message is a medium access control (MAC) control element (CE), and wherein the one or more of the UL SCH resources are determined to be usable in response to the one or more of the UL SCH resources being associated with HARQ processes of the first HARQ process type.

Clause 125: The method of clause 122, wherein the UL message is a medium access control (MAC) control element (CE) and UL data is to be transmitted along with the MAC CE, and wherein the one or more of the UL SCH resources are determined to be usable based on HARQ process type requirements of the UL data, or wherein the UL message is the MAC CE and a priority of the MAC CE is higher than a priority of the UL data, and the one or more of the UL SCH resources are determined to be usable in response to the one or more of the UL SCH resources being associated with HARQ processes of the first, second, or third HARQ process type.

Clause 126: The method of clause 122, wherein the UL message is a medium access control (MAC) control element (CE) and a MAC CE retransmission timer or MAC CE prohibit timer is started after the transmission of the MAC CE, and wherein one or more of the UL SCH resources are determined to be usable in response to the one or more of the UL SCH resources being associated with HARQ processes of any of the first, second, third, or fourth HARQ process types.

Clause 127: The method of clause 122, wherein the UL message a medium access control (MAC) control element (CE), wherein the UE is configured with one or more HARQ-MAC CE matching rules, each HARQ-MAC CE matching rule mapping a MAC CE type with acceptable HARQ process types comprising any combination of the first, second, third, and fourth HARQ process types, each HARQ-MAC CE matching rule being statically or semi-statically configured in the UE, and wherein the one or more of the UL SCH resources are determined to be usable in response to the one or more of the UL SCH resources being associated with HARQ processes of HARQ process types included in the acceptable HARQ process types corresponding to the MAC CE type of the UL MAC CE.

Clause 128: The method of any of clauses 121-127, further comprising: receiving a DL message on one or more of the DL SCH resources in response to the one or more DL SCH resources being determined based on the HARQ process type of the HARQ processes associated with the one or more of the DL SCH resources, at least one HARQ process being associated with the one or more of the DL SCH resources having the HARQ feedback enabled and the HARQ retransmission disabled.

Clause 129: The method of clause 128, wherein the DL message is a radio resource control (RRC) message, and the one or more of the DL SCH resources are determined in response to the one or more of the DL SCH resources being associated with HARQ processes of the first HARQ process type or the second HARQ process type, or wherein the DL message is a medium access control (MAC) control element (CE), and the one or more of the DL SCH resources are determined in response to the one or more of the DL SCH resources being associated with HARQ processes of the first, second, third, or fourth HARQ process types.

Clause 130: The method of any of clauses 121-129, further comprising: sending a scheduling request (SR) to the network node for SCH resources in response to one or more SCH resources not being determined to be usable, the SR indicating one or more HARQ process type requirements of the UL message.

Clause 131: A user equipment comprising at least one means for performing a method of any of clauses 121-130.

Clause 132: A user equipment comprising a processor, memory coupled with the processor, the processor and memory configured perform a method of any of clauses 121-130.

Clause 133: A non-transitory computer-readable medium storing code for a user equipment comprising a processor, memory coupled with the processor, and instructions stored in the memory and executable by the processor to cause the user equipment to perform a method of any of clauses 121-130.

Clause 134: A method of a network node, comprising: sending a grant of shared channel (SCH) resources to a user equipment (UE), the SCH resources comprising uplink (UL) SCH resources or downlink (DL) SCH resources or both, each of the SCH resources being associated with one of a plurality of hybrid automatic repeat request (HARQ) processes, each HARQ process being at least one of a plurality of HARQ process types, each HARQ process type being based on HARQ feedback status and HARQ retransmission status; receiving an UL message on one or more of the UL SCH resources; sending a HARQ positive acknowledgment (ACK) to the UE in response to the UL message being correctly received and when a HARQ process associated with the one or more UL SCH resources has HARQ feedback enabled; and sending a HARQ negative acknowledgment (NACK) to the UE in response to the UL message being incorrectly received and to the HARQ process being associated with the one or more UL SCH resources has HARQ feedback enabled, wherein a HARQ process type of at least one HARQ process has the HARQ feedback status enabled and the HARQ retransmission disabled.

Clause 135: The method of clause 134, wherein the plurality of HARQ process types includes first, second, third, and fourth HARQ process types, the first HARQ process type having the HARQ feedback status enabled and the HARQ retransmission status enabled, the second HARQ process type having the HARQ feedback status enabled and the HARQ retransmission status disabled, the third HARQ process type having the HARQ feedback status disabled and the HARQ retransmission status enabled, and the fourth HARQ process type having the HARQ feedback status disabled and the HARQ retransmission status disabled, and wherein a HARQ process type of at least one HARQ process is the second HARQ process type.

Clause 136: The method of clause 135, wherein the UL message is a radio resource control (RRC) message, and the one or more of the UL SCH resources are determined to be usable in response to the one or more of the UL SCH resources being associated with HARQ processes of the first HARQ process type or the second HARQ process type, or wherein the UL message is a medium access control (MAC) control element (CE), and the one or more of the UL SCH resources are determined to be usable in response to the one or more of the UL SCH resources being associated with HARQ processes of the first HARQ process type, or wherein the UL message is the MAC CE and UL data is to be transmitted along with the MAC CE, and the one or more of the UL SCH resources are determined to be usable based on HARQ process type requirements of the UL data, or wherein the UL message is the MAC CE that has higher priority than the UL data, and the one or more of the UL SCH resources are determined to be usable in response to the one or more of the UL SCH resources being associated with HARQ processes of the first, second, or third HARQ process type, or wherein the UL message is the MAC CE in which a MAC CE retransmission timer or MAC CE prohibit timer is started after the transmission thereof, and one or more of the UL SCH resources are determined to be usable in response to the one or more of the UL SCH resources being associated with HARQ processes of any of the first, second, third, or fourth HARQ process types.

Clause 137: The method of any of clauses 134-136, further comprising: transmitting a DL message on one or more of the DL SCH resources in response to the one or more DL SCH resources being determined to be usable based on the HARQ process type of the HARQ processes associated with the one or more of the DL SCH resources, a HARQ process type of at least one HARQ process associated with the one or more of the DL SCH resources being the second HARQ process type.

Clause 138: The method of clause 137, wherein the DL message is a radio resource control (RRC) message or a medium access control (MAC) control element (CE), and the one or more of the DL SCH resources are determined to be usable in response to the one or more of the DL SCH resources being associated with HARQ processes of the first HARQ process type or the second HARQ process type, or wherein the DL message is the MAC CE, and the one or more of the DL SCH resources are determined to be usable in response to the one or more of the DL SCH resources being associated with HARQ processes of any of the first, second, third, or fourth HARQ process types.

Clause 139: The method of any of clauses 134-138, further comprising: receiving a scheduling request (SR) for the UL SCH resources from the UE, wherein the SR indicates one or more HARQ process type requirements, and the SCH resources include one or more SCH resources associated with the HARQ processes of the requested HARQ process type requirements.

Clause 140: A network node comprising at least one means for performing a method of any of clauses 134-139.

Clause 141: A network node comprising a processor, memory coupled with the processor, the processor and memory configured perform a method of any of clauses 134-139.

Clause 142: A non-transitory computer-readable medium storing code for a network node comprising a processor, memory coupled with the processor, and instructions stored in the memory and executable by the processor to cause the user equipment to perform a method of any of clauses 134-139.

Clause 143: A method of a user equipment (UE), comprising: receiving a grant of downlink (DL) shared channel (SCH) resources from a network node, each of the DL SCH resources being associated with one of a plurality of hybrid automatic repeat request (HARQ) processes, each HARQ process being at least one of a plurality of HARQ process types, each HARQ process type being based on HARQ feedback status and HARQ retransmission status; receiving a DL message on one or more of the DL SCH resources in response to the one or more DL SCH resources being determined to be usable based on the HARQ process type of the HARQ processes associated with the one or more of the UL SCH resources; sending a HARQ positive acknowledgment (ACK) to the network node in response to the DL message being correctly received and a HARQ process being associated with the one or more DL SCH resources has HARQ feedback enabled; and sending a HARQ negative acknowledgment (NACK) to the network node in response to the DL message being incorrectly received and the HARQ process being associated with the one or more UL SCH resources has HARQ feedback enabled, wherein the DL message is a radio resource control (RRC) message or a medium access control (MAC) control element (CE).

Clause 144: A user equipment comprising at least one means for performing a method of clause 143.

Clause 145: A user equipment comprising a processor, memory coupled with the processor, the processor and memory configured perform a method of clause 143.

Clause 146: A non-transitory computer-readable medium storing code for a user equipment comprising a processor, memory coupled with the processor, and instructions stored in the memory and executable by the processor to cause the user equipment to perform a method of clause 143.

Clause 147: A method of a network node, comprising: sending a grant of downlink (DL) shared channel (SCH) resources to a user equipment (UE), each of the DL SCH resources being associated with one of a plurality of hybrid automatic repeat request (HARQ) processes, each HARQ process being at least one of a plurality of HARQ process types, each HARQ process type being based on HARQ feedback status and HARQ retransmission status; sending a DL message on one or more of the DL SCH resources in response to the one or more DL SCH resources being determined to be usable based on the HARQ process type of the HARQ processes associated with the one or more of the UL SCH resources, wherein the DL message is a radio resource control (RRC) message or a medium access control (MAC) control element (CE).

Clause 148: A network node comprising at least one means for performing a method of clause 147.

Clause 149: A network node comprising a processor, memory coupled with the processor, the processor and memory configured perform a method of clause 147.

Clause 150: A non-transitory computer-readable medium storing code for a network node comprising a processor, memory coupled with the processor, and instructions stored in the memory and executable by the processor to cause the network node to perform a method of clause 147.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A user equipment (UE), comprising:
one or more memories; and
one or more processors coupled to the one or more memories,
wherein the one or more processors are configured to:
receive a grant of uplink (UL) shared channel (SCH) resources from a network node, wherein each of the UL SCH resources is associated with one of one or more hybrid automatic repeat request (HARQ) processes, wherein each HARQ process is at least one HARQ process type of one or more HARQ process types, and wherein each HARQ process type is based on HARQ feedback status and HARQ retransmission status; and
transmit a control message on one or more UL SCH resources when the one or more UL SCH resources are determined to be usable based on the at least one HARQ process type of the one or more HARQ processes associated with the one or more UL SCH resources, wherein the control message is a radio resource control (RRC) message or a medium access control (MAC) control element (CE).

2. The UE of claim 1,
wherein the one or more HARQ process types include one or more of a first HARQ process type, a second HARQ process type, or a fourth HARQ process type, and
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled.

3. The UE of claim 2,
wherein the control message is the RRC message, and
wherein the one or more UL SCH resources are determined to be usable when the one or more UL SCH resources are associated with one or more HARQ processes of the first HARQ process type.

4. The UE of claim 2,
wherein the control message is the RRC message for transmission through a signaling radio bearer 1 (SRB1), a signaling radio bearer 2 (SRB2), or a signaling radio bearer 3 (SRB3) or is in a dedicated control channel (DCCH), and
wherein the one or more UL SCH resources are determined to be usable when the one or more UL SCH resources are associated with one or more HARQ processes of the first HARQ process type.

5. The UE of claim 2,
wherein the control message is the RRC message for transmission other than through a signaling radio bearer 1 (SRB1), a signaling radio bearer 2 (SRB2), or a signaling radio bearer 3 (SRB3) or is in a channel other than a dedicated control channel (DCCH), and
wherein the one or more UL SCH resources are determined to be usable when the one or more UL SCH resourdces are associated with one or more HARQ processes of the first HARQ process type, the second HARQ process type, or the fourth HARQ process type.

6. The UE of claim 5, wherein the one or more processors are further configured to:
retransmit, at an RRC layer of the UE, the RRC message when a physical (PHY) layer of the UE informs the RRC layer that a HARQ negative acknowledgement (NACK) corresponding to the RRC message is received or a HARQ timeout occurs subsequent to the RRC message transmission on the one or more UL SCH resources; or
retransmit, at radio link control (RLC) layer of the UE, the RRC message when the PHY layer of the UE informs the RLC layer that the NACK corresponding to the RRC message is received or the HARQ timeout occurs subsequent to the RRC message transmission on the one or more UL SCH resources.

7. The UE of claim 2,
wherein the control message is the MAC CE, and
wherein the one or more UL SCH resources are determined to be usable when the one or more UL SCH resources are associated with one or more HARQ processes of the first HARQ process type.

8. The UE of claim 2,
wherein the control message is the MAC CE and is determined that UL data is to be transmitted along with the MAC CE, and
wherein the one or more UL SCH resources are determined to be usable based on HARQ process type requirements of the UL data.

9. The UE of claim 2,
wherein the control message is the MAC CE and a priority of the MAC CE is higher than a priority of UL data, and
wherein the one or more UL SCH resources are determined to be usable when the one or more UL SCH resources are associated with one or more HARQ processes of the first HARQ process type, the second HARQ process type, or the fourth HARQ process type.

10. The UE of claim 2,
wherein the control message is the MAC CE,
wherein a MAC CE retransmission timer or a MAC CE prohibit timer is started after transmission of the MAC CE, and
wherein the one or more UL SCH resources are determined to be usable when the one or more UL SCH resources are associated with one or more HARQ processes of the first HARQ process type, the second HARQ process type, or the fourth HARQ process type.

11. The UE of claim 2,
wherein the control message is the MAC CE,
wherein the UE is configured with one or more HARQ-MAC CE matching rules, wherein each HARQ-MAC CE matching rule maps a MAC CE type with acceptable HARQ process types comprising one or more of the first HARQ process type, the second HARQ process type, or the fourth HARQ process type, and wherein each HARQ-MAC CE matching rule is statically or semi-statically configured in the UE, and
wherein the one or more UL SCH resources are determined to be usable when the one or more UL SCH resources are associated with one or more HARQ processes of HARQ process types included in the acceptable HARQ process types corresponding to the MAC CE type of the MAC CE.

12. The UE of claim 1, wherein the one or more processors are further configured to:
send a scheduling request (SR) to the network node for UL SCH resources when the one or more UL SCH resources are not determined to be usable, wherein the SR indicates one or more HARQ process type requirements of the control message.

13. The UE of claim 1, wherein the one or more processors are further configured to:
receive a message on one or more downlink (DL) SCH resources from the network node, wherein the message is an RRC message or a MAC CE,
wherein the one or more DL SCH resources are determined to be associated with one or more HARQ processes that have the HARQ feedback status enabled and the HARQ retransmission status enabled.

14. The UE of claim 1, wherein the one or more HARQ process types include a third HARQ process type that has the HARQ feedback status as disabled and the HARQ retransmission status as enabled.

15. A network node, comprising:
one or more memories; and
one or more processors coupled to the one or more memories, wherein the one or more processors are configured to:
transmit a control message on one or more downlink (DL) shared channel (SCH) resources when the one or more DL SCH resources are determined to be usable for the control message based on a HARQ process type of one or more HARQ processes associated with the one or more DL SCH resources, wherein each HARQ process is at least one HARQ process type of one or more HARQ process types, and wherein each HARQ process type is based on HARQ feedback status and HARQ retransmission status, and the control message is a radio resource control (RRC) message or a medium access control (MAC) control element (CE),
wherein the one or more HARQ process types include one or more of a first HARQ process type, a second HARQ process type, or a fourth HARQ process type, and
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled.

16. The network node of claim 15, wherein the one or more DL SCH resources are determined to be usable when the one or more DL SCH resources are associated with one or more HARQ processes of the first HARQ process type or the second HARQ process type.

17. The network node of claim 15,
wherein the control message is the MAC CE, and
wherein the one or more DL SCH resources are determined to be usable when the one or more DL SCH resources are associated with one or more HARQ processes of the first HARQ process type, the second HARQ process type, or the fourth HARQ process type.

18. The network node of claim 15, wherein the one or more HARQ process types include a third HARQ process type that has the HARQ feedback status as disabled and the HARQ retransmission status as enabled.

19. A user equipment (UE), comprising:
one or more memories; and
one or more processors coupled to the one or more memories,
wherein the one or more processors are configured to:
receive a grant of shared channel (SCH) resources from a network node, the SCH resources comprising uplink (UL) SCH resources or downlink (DL) SCH resources or both, wherein each of the SCH resources is associated with one of one or more hybrid automatic repeat request (HARQ) processes, wherein each HARQ process is at least one of one or more HARQ process types, and wherein each HARQ process type is based on HARQ feedback status and HARQ retransmission status; and
transmit an UL message on one or more UL SCH resources when the one or more UL SCH resources are determined to be usable based on the at least one HARQ process type of the one or more HARQ processes associated with the one or more UL SCH resources,
wherein the one or more HARQ process types include one or more of a first HARQ process type, a second HARQ process type, or a fourth HARQ process type,
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled, and
wherein a HARQ process type of at least one HARQ process is the second HARQ process type.

20. The UE of claim 19,
wherein the UL message is a radio resource control (RRC) message, and
wherein the one or more UL SCH resources are determined to be usable when the one or more UL SCH resources are associated with one or more HARQ processes of the first HARQ process type or the second HARQ process type.

21. The UE of claim 19,
wherein the UL message is a medium access control (MAC) control element (CE), and
wherein the one or more UL SCH resources are determined to be usable when the one or more UL SCH resources are associated with one or more HARQ processes of the first HARQ process type.

22. The UE of claim 19,
wherein the UL message is a medium access control (MAC) control element (CE) and UL data is to be transmitted along with the MAC CE, and the one or more UL SCH resources are determined to be usable based on HARQ process type requirements of the UL data, or
wherein the UL message is the MAC CE and a priority of the MAC CE is higher than a priority of the UL data, and the one or more UL SCH resources are determined to be usable when the one or more UL SCH resources are associated with one or more HARQ processes of the first HARQ process type or the second HARQ process type.

23. The UE of claim 19,
wherein the UL message is a medium access control (MAC) control element (CE),
wherein a MAC CE retransmission timer or a MAC CE prohibit timer is started after transmission of the MAC CE, and
wherein the one or more UL SCH resources are determined to be usable when the one or more UL SCH resources are associated with one or more HARQ processes of the first HARQ process type, the second HARQ process type, or the fourth HARQ process type.

24. The UE of claim 19,
wherein the UL message is a medium access control (MAC) control element (CE),
wherein the UE is configured with one or more HARQ-MAC CE matching rules, wherein each HARQ-MAC CE matching rule maps a MAC CE type with acceptable HARQ process types comprising the first HARQ process type, the second HARQ process type, or the fourth HARQ process type, and wherein each HARQ-MAC CE matching rule is statically or semi-statically configured in the UE, and
wherein the one or more UL SCH resources are determined to be usable when the one or more UL SCH resources are associated with one or more HARQ processes of HARQ process types included in the acceptable HARQ process types corresponding to the MAC CE type of the UL MAC CE.

25. The UE of claim 19, wherein the one or more processors are further configured to:
receive a DL message on one or more DL SCH resources when the one or more DL SCH resources are determined based on the HARQ process type of the one or more HARQ processes associated with the one or more DL SCH resources, wherein at least one HARQ process is associated with the one or more of the DL SCH resources that have the HARQ feedback status as enabled and the HARQ retransmission status as disabled.

26. The UE of claim 25,
wherein the DL message is a radio resource control (RRC) message, and the one or more DL SCH resources are determined to be usable when the one or more DL SCH resources are associated with one or more HARQ processes of the first HARQ process type or the second HARQ process type, or
wherein the DL message is a medium access control (MAC) control element (CE), and the one or more DL SCH resources are determined to be usable when the one or more DL SCH resources are associated with one or more HARQ processes of the first HARQ process type, the second HARQ process type, or the fourth HARQ process type.

27. The UE of claim 19, wherein the one or more processors are further configured to:
send a scheduling request (SR) to the network node for UL SCH resources when the one or more UL SCH resources are not determined to be usable, wherein the SR indicates one or more HARQ process type requirements of the UL message.

28. The UE of claim 19, wherein the one or more HARQ process types include a third HARQ process type that has the HARQ feedback status as disabled and the HARQ retransmission status as enabled.

29. A network node, comprising:
one or more memories; and
one or more processors coupled to the one or more memories, wherein the one or more processors are configured to:
send a grant of shared channel (SCH) resources to a user equipment (UE), the SCH resources comprising uplink (UL) SCH resources or downlink (DL) SCH resources or both, wherein each of the SCH resources are associated with one of one or more hybrid automatic repeat request (HARQ) processes, wherein each HARQ process is at least one of one or more HARQ process types, and wherein each HARQ process type is based on HARQ feedback status and HARQ retransmission status;
receive an UL message on one or more UL SCH resources;
send a HARQ positive acknowledgment (ACK) to the UE when the UL message is correctly received and when a HARQ process is associated with the one or more UL SCH resources that have HARQ feedback status as enabled; and
send a HARQ negative acknowledgment (NACK) to the UE when the UL message is incorrectly received and when the HARQ process is associated with the one or more UL SCH resources that have HARQ feedback status as enabled,
wherein the one or more HARQ process types include one or more of a first HARQ process type, a second HARQ process type, or a fourth HARQ process type,
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled, and
wherein a HARQ process type of at least one HARQ process is the second HARQ process type.

30. The network node of claim 29,
wherein the UL message is a radio resource control (RRC) message, and the one or more UL SCH resources are determined to be usable when the one or more UL SCH resources are associated with one or more HARQ processes of the first HARQ process type or the second HARQ process type, or
wherein the UL message is a medium access control (MAC) control element (CE), and the one or more UL SCH resources are determined to be usable when the one or more UL SCH resources are associated with one or more HARQ processes of the first HARQ process type, or
wherein the UL message is the MAC CE and UL data is to be transmitted along with the MAC CE, and the one or more UL SCH resources are determined to be usable based on HARQ process type requirements of the UL data, or
wherein the UL message is the MAC CE that has higher priority than the UL data, and the one or more UL SCH resources are determined to be usable when the one or more UL SCH resources are associated with one or more HARQ processes of the first HARQ process type or the second HARQ process type, or
wherein the UL message is the MAC CE in which a MAC CE retransmission timer or MAC CE prohibit timer is started after transmission of the MAC CE, and the one or more UL SCH resources are determined to be usable when the one or more UL SCH resources are associated with one or more HARQ processes of the first HARQ process type, the second HARQ process type, or the fourth HARQ process type.

31. The network node of claim 29, wherein the one or more processors are configured to:
transmit a DL message on one or more DL SCH resources when the one or more DL SCH resources are determined to be usable based on the at least one HARQ process type of the one or more HARQ processes associated with the one or more DL SCH resources, wherein a HARQ process type of at least one HARQ process associated with the one or more DL SCH resources is the second HARQ process type.

32. The network node of claim 28,
wherein the DL message is a radio resource control (RRC) message or a medium access control (MAC) control element (CE), and the one or more DL SCH resources are determined to be usable when the one or more DL SCH resources are associated with one or more HARQ processes of the first HARQ process type or the second HARQ process type, or
wherein the DL message is the MAC CE, and the one or more DL SCH resources are determined to be usable when the one or more DL SCH resources are associated with one or more HARQ processes of the first HARQ process type, the second HARQ process type, or the fourth HARQ process type.

33. The network node of claim 29, wherein the one or more processors are further configured to:
receive a scheduling request (SR) for the UL SCH resources from the UE,
wherein the SR indicates one or more HARQ process type requirements, and the SCH resources include one or more SCH resources associated with the HARQ processes of requested HARQ process type requirements.

34. The network node of claim 29, wherein the one or more HARQ process types include a third HARQ process type that has the HARQ feedback status as disabled and the HARQ retransmission status as enabled.

35. A method of a user equipment (UE), the method comprising:
receiving a grant of uplink (UL) shared channel (SCH) resources from a network node, wherein each of the UL SCH resources is associated with one of one or more hybrid automatic repeat request (HARQ) processes, wherein each HARQ process is at least one of one or more HARQ process types, and wherein each HARQ process type is based on HARQ feedback status and HARQ retransmission status; and
transmitting a control message on one or more UL SCH resources when the one or more UL SCH resources are determined to be usable based on the at least one HARQ process type of the one or more HARQ processes associated with the one or more UL SCH resources, wherein the control message is a radio resource control (RRC) message or a medium access control (MAC) control element (CE).

36. The method of claim 35,
wherein the one or more HARQ process types include one or more of a first HARQ process type, a second HARQ process type, or a fourth HARQ process type, and
wherein
the first HARQ process type has the HARQ feedback status as enabled and the HARQ retransmission status as enabled, the second HARQ process type has the HARQ feedback status as enabled and the HARQ retransmission status as disabled, or the fourth HARQ process type has the HARQ feedback status as disabled and the HARQ retransmission status as disabled.

37. The method of claim 36,
wherein the control message is the RRC message, and
wherein the one or more UL SCH resources are determined to be usable when the one or more UL SCH resources are associated with one or more HARQ processes of the first HARQ process type.

38. The method of claim 36,
wherein the control message is the RRC message for transmission other than through a signaling radio bearer 1 (SRB1), a signaling radio bearer 2 (SRB2), or a signaling radio bearer 3(SRB3) or is in a channel other than a dedicated control channel (DCCH), and
wherein the one or more UL SCH resources are determined to be usable when the one or more UL SCH resources are associated with one or more HARQ processes of the first HARQ process type, the second HARQ process type, or the fourth HARQ process type.

39. The method of claim 36,
wherein the control message is the MAC CE, and
wherein the one or more UL SCH resources are determined to be usable when the one or more UL SCH resources are associated with one or more HARQ processes of the first HARQ process type.

40. The method of claim 36,
wherein the control message is the MAC CE and a priority of the MAC CE is higher than a priority of UL data, and
wherein the one or more UL SCH resources are determined to be usable when the one or more UL SCH resources are associated with one or more HARQ processes of the first HARQ process type or the second HARQ process type.

41. The method of claim 35, wherein the one or more HARQ process types include a third HARQ process type that has the HARQ feedback status as disabled and the HARQ retransmission status as enabled.

42. A method of a network node, the method comprising:
transmitting a control message on one or more downlink (DL) shared channel (SCH) resources when the one or more DL SCH resources are determined to be usable for the control message based on a HARQ process type of one or more HARQ processes associated with the one or more DL SCH resources, wherein each HARQ process is at least one of one or more HARQ process types, and wherein each HARQ process type is based on HARQ feedback status and HARQ retransmission status, and the control message is a radio resource control (RRC) message or a medium access control (MAC) control element (CE), and
wherein the one or more HARQ process types include one or more of a first HARQ process type, a second HARQ process type, or a fourth HARQ process type, and
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled.

43. The method of claim 42, wherein the one or more DL SCH resources are determined to be usable when the one or more DL SCH resources are associated with one or more HARQ processes of the first HARQ process type or the second HARQ process type.

44. The method of claim 42, wherein the one or more HARQ process types include a third HARQ process type that has the HARQ feedback status as disabled and the HARQ retransmission status as enabled.

45. A method of a user equipment (UE), the method comprising:
receiving a grant of shared channel (SCH) resources from a network node, the SCH resources comprising uplink (UL) SCH resources or downlink (DL) SCH resources or both, wherein each of the SCH resources is associated with one of one or more hybrid automatic repeat request (HARQ) processes, wherein each HARQ process is at least one of one or more HARQ process types, and wherein each HARQ process type is based on HARQ feedback status and HARQ retransmission status; and
transmitting an UL message on one or more UL SCH resources when the one or more UL SCH resources are determined to be usable based on the at least one HARQ process type of the one or more HARQ processes associated with the one or more UL SCH resources,
wherein the one or more HARQ process types include one or more of a first HARQ process type, a second HARQ process type, or a fourth HARQ process type,
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled, and
wherein a HARQ process type of at least one HARQ process is the second HARQ process type.

46. The method of claim 45,
wherein the UL message is a radio resource control (RRC) message, and
wherein the one or more UL SCH resources are determined to be usable when the one or more UL SCH resources are associated with one or more HARQ processes of the first HARQ process type or the second HARQ process type.

47. The method of claim 45,
wherein the UL message is a medium access control (MAC) control element (CE), and
wherein the one or more UL SCH resources are determined to be usable when the one or more UL SCH resources are associated with one or more HARQ processes of the first HARQ process type.

48. The method of claim 45,
wherein the UL message is a medium access control (MAC) control element (CE) and UL data is to be transmitted along with the MAC CE, and the one or more UL SCH resources are determined to be usable based on HARQ process type requirements of the UL data, or
wherein the UL message is the MAC CE and a priority of the MAC CE is higher than a priority of the UL data, and the one or more UL SCH resources are determined to be usable when the one or more UL SCH resources are associated with one or more HARQ processes of the first HARQ process type or the second HARQ process type.

49. The method of claim 45,
wherein the UL message is a medium access control (MAC) control element (CE),
wherein a MAC CE retransmission timer or a MAC CE prohibit timer is started after transmission of the MAC CE, and
wherein the one or more UL SCH resources are determined to be usable when the one or more UL SCH resources are associated with one or more HARQ processes of the first HARQ process type, the second HARQ process type, or the fourth HARQ process type.

50. The method of claim 45, wherein the one or more HARQ process types include a third HARQ process type that has the HARQ feedback status as disabled and the HARQ retransmission status as enabled.

51. A method of a network node, the method comprising:
sending a grant of shared channel (SCH) resources to a user equipment (UE), the SCH resources comprising uplink (UL) SCH resources or downlink (DL) SCH resources or both, wherein each of the SCH resources are associated with one of one or more hybrid automatic repeat request (HARQ) processes, wherein each HARQ process is at least one of one or more HARQ process types, and wherein each HARQ process type is based on HARQ feedback status and HARQ retransmission status;
receiving an UL message on one or more UL SCH resources;
sending a HARQ positive acknowledgment (ACK) to the UE when the UL message is correctly received and when a HARQ process is associated with the one or more UL SCH resources that have HARQ feedback status as enabled; and
sending a HARQ negative acknowledgment (NACK) to the UE when the UL message is incorrectly received and when the HARQ process is associated with the one or more UL SCH resources that have HARQ feedback status as enabled,
wherein the one or more HARQ process types include one or more of a first HARQ process type, a second HARQ process type, or a fourth HARQ process type,
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled, and
wherein a HARQ process type of at least one HARQ process is the second HARQ process type.

52. The method of claim 51,
wherein the UL message is a radio resource control (RRC) message, and the one or more UL SCH resources are determined to be usable when the one or more UL SCH resources are associated with one or more HARQ processes of the first HARQ process type or the second HARQ process type, or
wherein the UL message is a medium access control (MAC) control element (CE), and the one or more UL SCH resources are determined to be usable when the one or more UL SCH resources are associated with one or more HARQ processes of the first HARQ process type, or
wherein the UL message is the MAC CE and UL data is to be transmitted along with the MAC CE, and the one or more UL SCH resources are determined to be usable based on HARQ process type requirements of the UL data, or
wherein the UL message is the MAC CE that has higher priority than the UL data, and the one or more UL SCH resources are determined to be usable when the one or more UL SCH resources are associated with one or more HARQ processes of the first HARQ process type or the second HARQ process type, or
wherein the UL message is the MAC CE in which a MAC CE retransmission timer or MAC CE prohibit timer is started after transmission of the MAC CE, and the one or more UL SCH resources are determined to be usable when the one or more UL SCH resources are associated with one or more HARQ processes of the first HARQ process type, the second HARQ process type, or the fourth HARQ process type.

53. The method of claim 51, further comprising:
transmitting a DL message on one or more DL SCH resources when the one or more DL SCH resources are determined to be usable based on the at least one HARQ process type of the one or more HARQ processes associated with the one or more DL SCH resources, wherein a HARQ process type of at least one HARQ process associated with the one or more DL SCH resources is the second HARQ process type.

54. The method of claim 53,
wherein the DL message is a radio resource control (RRC) message or a medium access control (MAC) control element (CE), and the one or more DL SCH resources are determined to be usable when the one or more DL SCH resources are associated with one or more HARQ processes of the first HARQ process type or the second HARQ process type, or
wherein the DL message is the MAC CE, and the one or more DL SCH resources are determined to be usable when the one or more DL SCH resources are associated with one or more HARQ processes of the first HARQ process type, the second HARQ process type, or the fourth HARQ process type.

55. The method of claim 51, wherein the one or more HARQ process types include a third HARQ process type that has the HARQ feedback status as disabled and the HARQ retransmission status as enabled.

56. A non-transitory computer-readable medium storing computer-executable instructions for a user equipment (UE), the computer-executable instructions comprising one or more instructions causing the UE to:
receive a grant of uplink (UL) shared channel (SCH) resources from a network node, wherein each of the UL SCH resources is associated with one of one or more hybrid automatic repeat request (HARQ) processes, wherein each HARQ process is at least one of one or more HARQ process types, and wherein each HARQ process type is based on HARQ feedback status and HARQ retransmission status; and
transmit a control message on one or more UL SCH resources when the one or more UL SCH resources are determined to be usable based on the at least one HARQ process type of the one or more HARQ processes associated with the one or more UL SCH resources, wherein the control message is a radio resource control (RRC) message or a medium access control (MAC) control element (CE).

57. The non-transitory computer-readable medium of claim 56, wherein the one or more HARQ process types include a third HARQ process type that has the HARQ feedback status as disabled and the HARQ retransmission status as enabled.

58. A non-transitory computer-readable medium storing computer-executable instructions for a network node, the computer-executable instructions comprising one or more instructions causing the network node to:
transmit a control message on one or more downlink (DL) shared channel (SCH) resources when the one or more DL SCH resources are determined to be usable for the control message based on a HARQ process type of one or more HARQ processes associated with the one or more DL SCH resources, wherein each HARQ process is at least one of one or more HARQ process types, and wherein each HARQ process type is based on HARQ feedback status and HARQ retransmission status, and the control message is a radio resource control (RRC) message or a medium access control (MAC) control element (CE),
wherein the one or more HARQ process types include one or more of a first HARQ process type, a second HARQ process type, or a fourth HARQ process type, and
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled.

59. The non-transitory computer-readable medium of claim 58, wherein the one or more HARQ process types include a third HARQ process type that has the HARQ feedback status as disabled and the HARQ retransmission status as enabled.

60. A non-transitory computer-readable medium storing computer-executable instructions for a user equipment (UE), the computer-executable instructions comprising one or more instructions causing the UE to:
receive a grant of shared channel (SCH) resources from a network node, the SCH resources comprising uplink (UL) SCH resources or downlink (DL) SCH resources or both, wherein each of the SCH resources is associated with one of one or more hybrid automatic repeat request (HARQ) processes, wherein each HARQ process is at least one of one or more HARQ process types, and wherein each HARQ process type is based on HARQ feedback status and HARQ retransmission status; and
transmit an UL message on one or more UL SCH resources when the one or more UL SCH resources are determined to be usable based on the at least one HARQ process type of the one or more HARQ processes associated with the one or more UL SCH resources, wherein the one or more HARQ process types include one or more of a first HARQ process type, a second HARQ process type, or a fourth HARQ process type,
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled, and
wherein a HARQ process type of at least one HARQ process is the second HARQ process type.

61. The non-transitory computer-readable medium of claim 60, wherein the one or more HARQ process types include a third HARQ process type that has the HARQ feedback status as disabled and the HARQ retransmission status as enabled.

62. A non-transitory computer-readable medium storing computer-executable instructions for a network node, the computer-executable instructions comprising one or more instructions causing the network node to:
send a grant of shared channel (SCH) resources to a user equipment (UE), the SCH resources comprising uplink (UL) SCH resources or downlink (DL) SCH resources or both, wherein each of the SCH resources are associated with one of one or more hybrid automatic repeat request (HARQ) processes, wherein each HARQ process is at least one of one or more HARQ process types, and wherein each HARQ process type is based on HARQ feedback status and HARQ retransmission status;
receive an UL message on one or more UL SCH resources;
send a HARQ positive acknowledgment (ACK) to the UE when the UL message is correctly received and when a HARQ process is associated with the one or more UL SCH resources that have HARQ feedback status as enabled; and
send a HARQ negative acknowledgment (NACK) to the UE when the UL message is incorrectly received and when the HARQ process is associated with the one or more UL SCH resources that have HARQ feedback status as enabled,
wherein the one or more HARQ process types include one or more of a first HARQ process type, a second HARQ process type, or a fourth HARQ process type,
wherein
the first HARQ process type has the HARQ feedback status as enabled and the HARQ retransmission status as enabled,
the second HARQ process type has the HARQ feedback status as enabled and the HARQ retransmission status as disabled, or
the fourth HARQ process type has the HARQ feedback status as disabled and the HARQ retransmission status as disabled, and
wherein a HARQ process type of at least one HARQ process is the second HARQ process type.

63. The non-transitory computer-readable medium of claim 62, wherein the one or more HARQ process types include a third HARQ process type that has the HARQ feedback status as disabled and the HARQ retransmission status as enabled.

* * * * *